(12) United States Patent
Sipe et al.

(10) Patent No.: US 8,457,367 B1
(45) Date of Patent: Jun. 4, 2013

(54) FACIAL RECOGNITION

(75) Inventors: Michael Andrew Sipe, Pittsburgh, PA (US); Henry Will Schneiderman, Pittsburgh, PA (US); Michael Christian Nechyba, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/533,811

(22) Filed: Jun. 26, 2012

(51) Int. Cl.
*G06K 9/62* (2006.01)

(52) U.S. Cl.
USPC .......................................... 382/118

(58) Field of Classification Search
None
See application file for complete search history.

(56) References Cited

U.S. PATENT DOCUMENTS

| | | | |
|---|---|---|---|
| 6,285,780 B1 * | 9/2001 | Yamakita et al. | 382/110 |
| 6,381,345 B1 * | 4/2002 | Swain | 382/117 |
| 6,801,640 B1 | 10/2004 | Okubo et al. | |
| 6,829,384 B2 | 12/2004 | Schneiderman et al. | |
| 6,947,579 B2 | 9/2005 | Bronstein et al. | |
| 7,127,087 B2 | 10/2006 | Huang et al. | |
| 7,194,114 B2 | 3/2007 | Schneiderman | |
| 7,421,097 B2 | 9/2008 | Hamza et al. | |
| 7,715,599 B2 | 5/2010 | Hiraizumi et al. | |
| 7,755,619 B2 | 7/2010 | Wang et al. | |
| 7,848,566 B2 | 12/2010 | Schneiderman | |
| 7,986,816 B1 | 7/2011 | Hoanca et al. | |
| 8,064,688 B2 | 11/2011 | Schneiderman | |
| 8,254,647 B1 | 8/2012 | Nechyba et al. | |
| 8,284,019 B2 | 10/2012 | Pishva | |
| 2005/0212654 A1 | 9/2005 | Yoda | |
| 2006/0026427 A1 | 2/2006 | Jefferson | |
| 2007/0253604 A1 | 11/2007 | Inoue et al. | |
| 2007/0291998 A1 | 12/2007 | Takizawa et al. | |
| 2008/0080748 A1 | 4/2008 | Sukegawa et al. | |
| 2008/0247611 A1 | 10/2008 | Aisaka et al. | |
| 2009/0067681 A1 | 3/2009 | Michaeli | |
| 2009/0232363 A1 | 9/2009 | Ohashi et al. | |
| 2010/0074479 A1 | 3/2010 | Chou et al. | |
| 2010/0135541 A1 | 6/2010 | Lai et al. | |

(Continued)

FOREIGN PATENT DOCUMENTS

| | | |
|---|---|---|
| KR | 20040048753 A | 6/2004 |
| WO | 2010043771 A1 | 4/2010 |
| WO | 2011042601 A1 | 4/2011 |

OTHER PUBLICATIONS

U.S. Appl. No. 13/533,682, by Steven James Ross, filed Jun. 26, 2012.

(Continued)

*Primary Examiner* — Brian P Werner
(74) *Attorney, Agent, or Firm* — Shumaker & Sieffert, P.A.

(57) ABSTRACT

An example method includes receiving first and second images of a face of a user, where one or both images have been granted a match by facial recognition. The method includes identifying at least one facial landmark in the first image and at least one corresponding facial landmark in the second image, and extracting a first sub-image from the first image, where the first sub-image includes a representation of the at least one facial landmark. The method includes extracting a second sub-image from the second image, where the second sub-image includes a representation of the at least one corresponding facial landmark, detecting a facial gesture by determining whether a sufficient difference exists between the second sub-image and first sub-image to indicate the facial gesture, and determining, based on detecting the facial gesture, whether to deny authentication to the user with respect to accessing functionalities controlled by the computing device.

25 Claims, 15 Drawing Sheets

U.S. PATENT DOCUMENTS

| | | |
|---|---|---|
| 2010/0246906 A1 | 9/2010 | Lovell et al. |
| 2010/0310133 A1 | 12/2010 | Mason et al. |
| 2011/0188712 A1 | 8/2011 | Yoo et al. |
| 2012/0075452 A1* | 3/2012 | Ferren .............................. 348/78 |

OTHER PUBLICATIONS

U.S. Appl. No. 13/533,723, by Yong Zhao, filed Jun. 26, 2012.
U.S. Appl. No. 13/533,834, by Michael Nechyba, filed Jun. 26, 2012.
U.S. Appl. No. 13/524,745, by Michael Christian Nechyba, filed Jun. 15, 2012.
Brian, "Can Android's new Face Unlock feature be hacked using a photo? Google says no," The next Web, retrieved at http://thenextweb.com/google/2011/10/20/can-androids-new-face-unlock-feature-be-hacked-using-a-photo-google-says-no/, Oct. 20, 2011, 2 pp.
Visidon, "Face Recognition," retrieved from http://www.visidon.fi/en/Face_Recognition, accessed on May 18, 2012, 1 pp.
Notice of Allowance from U.S. Appl. No. 13/533,834, dated Oct. 15, 2012, 9 pp.

* cited by examiner

FACIAL RECOGNITION

TECHNICAL FIELD

This disclosure relates to facial recognition technology.

BACKGROUND

A user may activate or otherwise gain access to functionalities controlled by a computing device by "unlocking" the device. In some instances, a computing device may be configured to permit unlocking based on authentication information provided by the user. Authentication information may take various forms, including alphanumeric passcodes and biometric information. Examples of biometric information include fingerprints, retina scans, and facial images. A computing device may authenticate a facial image input using facial recognition technology.

SUMMARY

In one example, a method includes receiving, from an image capture device coupled to a computing device, a first image of a face of a user, and a second image of the face of the user. The method further includes detecting a liveness gesture based on at least one of a yaw angle of the second image relative to the first image and a pitch angle of the second image relative to the first image, where the yaw angle corresponds to a transition along a horizontal axis, and where the pitch angle corresponds to a transition along a vertical axis. The method further includes generating a liveness score based on at least one of a yaw angle magnitude associated with the yaw angle and a pitch angle magnitude associated with the pitch angle, comparing the liveness score to a threshold value, and determining, based at least in part on the comparison, whether to deny authentication to the user with respect to accessing one or more functionalities controlled by the computing device.

In another example, a computer-readable storage device is encoded with instructions that, when executed, cause one or more processors of a computing device to perform operations. The operations include receiving, from an image capture device coupled to the computing device, a first image of a face of a user, and a second image of the face of the user. The operations further include detecting a liveness gesture based on at least one of a yaw angle of the second image relative to the first image and a pitch angle of the second image relative to the first image, where the yaw angle corresponds to a transition centered around a vertical axis, and where the pitch angle corresponds to a transition centered around a horizontal axis. The operations further include generating a liveness score based on at least one of a yaw angle magnitude associated with the yaw angle and a pitch angle magnitude associated with the pitch angle, comparing the liveness score to a threshold value, and determining, based at least in part on the comparison, whether to deny authentication to the user with respect to accessing one or more functionalities controlled by the computing device.

In another example, a computing device includes a memory, at least one processor, an image capture device, a facial recognition module, and an anti-spoofing module. The image capture device is operable by the at least one processor to capture a first image of a face of a user and a second image of the face of the user, and the facial recognition module is operable by the at least one processor to grant a match, by facial recognition, to at least one of the first image and the second image. The anti-spoofing module is operable by the at least one processor to detect a liveness gesture based on at least one of a yaw angle of the second image relative to the first image and a pitch angle of the second image relative to the first image, where the yaw angle corresponds to a transition centered around a vertical axis, and where the pitch angle corresponds to a transition centered around a horizontal axis. The anti-spoofing module is further operable by the at least one processor to generate a liveness score based on at least one of a yaw angle magnitude associated with the yaw angle and a pitch angle magnitude associated with the pitch angle, compare the liveness score to a threshold value, and determine, based at least in part on the comparison, whether to deny authentication to the user with respect to accessing one or more functionalities controlled by the computing device.

In another example, a method includes receiving, from an image capture device coupled to a computing device, a first image of a face of a user, and a second image of the face of the user. The method further includes identifying at least one facial landmark in the first image and at least one corresponding facial landmark in the second image, and extracting, by the computing device, a first sub-image from the first image, where the first sub-image represents a portion of the first image, and where the first sub-image includes a representation of the at least one facial landmark. The method further includes extracting, by the computing device, a second sub-image from the second image, where the second sub-image represents a portion of the second image, and where the second sub-image includes a representation of the at least one corresponding facial landmark, and detecting a facial gesture by determining, by the computing device, whether a sufficient difference exists between the second sub-image and the first sub-image to indicate the facial gesture. The method further includes determining, based at least in part on detecting the facial gesture, whether to deny authentication to the user with respect to accessing one or more functionalities controlled by the computing device.

In another example, a computer-readable storage device is encoded with instructions that, when executed, cause one or more processors of a computing device to perform operations. The operations include receiving, from an image capture device coupled to the computing device, a first image of a face of a user, and a second image of the face of the user. The operations further include identifying at least one facial landmark in the first image and at least one corresponding facial landmark in the second image, and extracting, by the computing device, a first sub-image from the first image, where the first sub-image represents a portion of the first image, and where the first sub-image includes a representation of the at least one facial landmark. The operations further include extracting, by the computing device, a second sub-image from the second image, where the second sub-image represents a portion of the second image, and where the second sub-image includes a representation of the at least one corresponding facial landmark, and detecting a facial gesture by determining, by the computing device, whether a sufficient difference exists between the second sub-image and the first sub-image to indicate the facial gesture. The operations further include determining, based at least in part on detecting the facial gesture, whether to deny authentication to the user with respect to accessing one or more functionalities controlled by the computing device.

In another example, a computing device includes a memory, at least one processor; at least one image capture device operable by the at least one processor to capture a first image of a face of a user, and a second image of the face of the user, and a facial recognition module operable by the at least one processor to grant a match, by facial recognition, to at least one of the first image and the second image. The computing device also includes a landmark detection module operable to identify at least one facial landmark in the first image and at least one corresponding facial landmark in the second image, and a sub-image extraction module operable to extract a first sub-image from the first image, where the first sub-image represents a portion of the first image, and where the first sub-image includes a representation of the at least one facial landmark. The computing device also includes an anti-spoofing module operable to detect a facial gesture by determining whether a sufficient difference exists between the second sub-image and the first sub-image to indicate the facial gesture, and to determine, based at least in part on detecting the facial gesture, whether to deny authentication to the user with respect to accessing one or more functionalities controlled by the computing device.

DETAILED DESCRIPTION

Figure 1A:
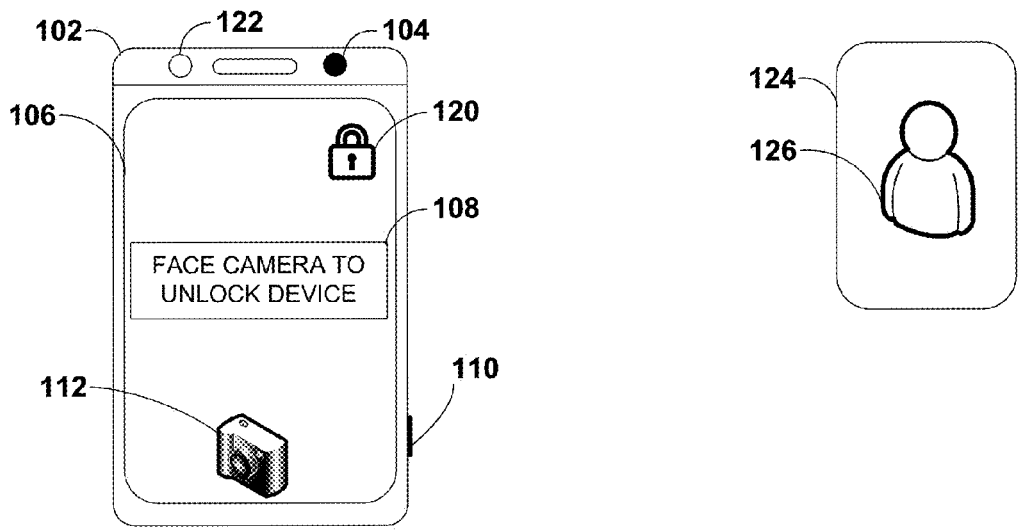
FIGS. 1A-1B are conceptual diagrams illustrating an example computing device for detecting possible spoofing in captured facial images, in accordance with one or more aspects of the present disclosure.

A computing device may use facial recognition programs in various scenarios. For example, a computing device may use facial recognition programs to authenticate a user who attempts to gain access to one or more functionalities of the computing device or functionalities otherwise controlled by the computing device. In some common scenarios, a computing device may store images of the faces of one or more authorized users (or "enrollment images"). When a user attempts to gain access to functionalities of (or "unlock") the computing device, the computing device may capture an image of the user's face for authentication purposes. The computing device may then use facial recognition programs to compare the captured facial image to the enrollment images associated with authorized users. If the facial recognition programs determine an acceptable level of match between the captured facial image and at least one enrollment image, the computing device may authenticate the user, and grant the unlock request.

Unauthorized users may leverage vulnerabilities of facial recognition programs to cause erroneous authentication. For example, an unauthorized user may attempt to unlock a computing device using "spoofing" techniques. To cause erroneous authentication by spoofing, an unauthorized user may present a facial image of an authorized user for capture by the computing device. For example, an unauthorized user may present to the device a printed picture of the authorized user's face or obtain a video or digital image of an authorized user on a second computing device (e.g., by pulling up an authorized user's profile picture from a social networking website). Thus, an unauthorized user may attempt to use spoofing methods to gain access to functionalities of the computing device to overcome authentication constraints otherwise implemented by the computing device.

In general, the present disclosure is directed to techniques for preventing erroneous authentication caused by spoofing. A computing device may implement one or more anti-spoofing programs that detect suspected attempts to spoof, and prevent erroneous authentication due to spoofing. In some examples, the anti-spoofing techniques may be performed by programs that cause one or more hardware components of the computing device to emit light in the direction of the object of the captured facial image. The anti-spoofing programs may then identify one or more landmarks within the captured facial image, and analyze the landmarks for possible signs of spoofing. For example, the anti-spoofing programs may identify one or both eyes of the facial image as landmarks. The anti-spoofing programs may then analyze the image to detect for a presence of any reflection of the emitted light from the eyes, such as corneal glint. Based on the analysis, the anti-spoofing programs may transition the computing device from a locked state to an unlocked state when the expected glint is detected, or prevent access to the computing device when the expected glint is not detected.

The anti-spoofing programs described herein may provide one or more advantages, such as reduced chances of an unauthorized user causing erroneous authentication by spoofing. For example, the anti-spoofing programs may cause the facial recognition programs to deny authentication to a user when the analyzed images of the landmarks do not include a reflection of the emitted light at all, or when an intensity of the reflected light in the images is below a threshold intensity. In another example, the anti-spoofing programs may cause the computing device to capture two or more facial images while emitting varying intensities of light, and cause the facial recognition programs to deny authentication if the landmarks do not reflect sufficiently varying intensities of light from one facial image to another. In yet another example, the anti-spoofing programs may cause the facial recognition programs to deny authentication to a user if the image analysis indicates that the light reflected from the landmarks does not sufficiently match an expected frequency content of the emitted light. For example, a computing device may emit light beams having different colors, or frequencies, that are expected to induce in the eyes of a user a reflection of light having a corresponding frequency content. In this manner, techniques of the present disclosure may reduce the occurrence of erroneous authentication caused by spoofing. In addition, the anti-spoofing programs may reduce the usage of the facial recognition programs, thus conserving computing resources and reducing power consumption (e.g., extending battery life in mobile computing devices).

The present disclosure also describes additional techniques to prevent erroneous authentication caused by spoofing. A computing device may implement one or more anti-spoofing programs that detect suspected attempts to spoof, and prevent erroneous authentication due to spoofing. In some examples, the anti-spoofing techniques may include capturing multiple facial images of a user, and analyzing the facial images for indications of liveness. Liveness may be indicated by certain gestures, such as movement of the head around a vertical axis (e.g., shaking one's head) and/or a horizontal axis (e.g., nodding one's head). The computing device may present prompts that instruct the user to perform one or more liveness gestures. The anti-spoofing programs may, in various implementations, detect liveness gestures based on specific orientations of the user's face. For example, the anti-spoofing programs may detect a "yaw" angle corresponding with movement of the user's head around the vertical axis. Similarly, the anti-spoofing programs may detect a "pitch" angle corresponding with movement of the user's head around the horizontal axis. The anti-spoofing programs may additionally determine the magnitude of the yaw and/or pitch angle to obtain a liveness score of the facial images. In turn, if the liveness score exceeds a predetermined threshold value, the anti-spoofing programs may determine that the liveness gesture is adequate to demonstrate that a legitimate live user is attempting to access functionalities controlled by the computing device. Based on the analysis and the detection of an adequate liveness gesture, the anti-spoofing programs may transition the computing device from a locked state to an unlocked state. On the other hand, the anti-spoofing programs may prevent access to functionalities controlled by the computing device when an adequate liveness gesture is not detected.

The present disclosure also describes additional techniques for preventing erroneous authentication caused by spoofing. A computing device may implement one or more anti-spoofing programs that detect suspected attempts to spoof, and prevent erroneous authentication due to spoofing. In some examples, the anti-spoofing techniques may include capturing multiple facial images of a user, and analyzing the facial images for indications of liveness. Liveness may be indicated by facial gestures, such as movement of the eyes, mouth, and other portions of the face. The anti-spoofing programs may, in various implementations, detect facial gestures based on specific areas of the human face. For example, the anti-spoofing programs may identify one or both eyes of the facial image as landmarks. The anti-spoofing programs may then detect and analyze transitions between the images as relates to one or both eyes. Using any detected transitions, the anti-spoofing programs may detect facial gestures such as a blink, wink, and others. The computing device may present prompts that instruct the user to perform one or more facial gestures. Based on the analysis and the detection of a satisfactory facial gesture, the anti-spoofing programs may transition the computing device from a locked state to an unlocked state. On the other hand, the anti-spoofing programs may prevent access to functionalities controlled by the computing device when a satisfactory facial gesture is not detected.

The anti-spoofing programs may provide one or more advantages, such as reduced chances of an unauthorized user causing erroneous authentication by spoofing. For example, the anti-spoofing programs may cause the facial recognition programs to deny authentication to a user when the analyzed facial images do not indicate a facial gesture or expected series of facial gestures, indicate a facial gesture other than one sought by the anti-spoofing programs, indicate a facial gesture of insufficient quality/clarity, etc. In some implementations, the anti-spoofing programs may detect a combination of facial gestures to establish liveness. For example, the anti-spoofing programs may identify a blink (open-shut-open of both eyes) preceding a wink (open-shut-open of only one eye). In these and other implementations, the anti-spoofing programs may detect facial gestures using a combination of landmarks. For example, the anti-spoofing programs may use the eyes as a landmark for a blink gesture, and use the mouth as a landmark for a smile gesture. In this manner, techniques of the present disclosure may reduce the occurrence of erroneous authentication caused by spoofing.

The anti-spoofing programs may provide one or more advantages, such as reduced chances of an unauthorized user causing erroneous authentication by spoofing. For example, the anti-spoofing programs may cause the facial recognition programs to deny authentication to a user when the analyzed facial images do not indicate an adequate liveness gesture, do not indicate a proper set, series, or sequence of liveness gestures, indicate a liveness gesture other than one sought by the anti-spoofing programs, etc. In some implementations, the anti-spoofing programs may detect a combination of liveness gestures to establish that a legitimate live user is attempting to unlock the computing device. For example, the anti-spoofing programs may identify a leftward pan of the user's head (discerned by the yaw angle between the images) preceding an upward look (discerned from the pitch angle between the images). In these and other implementations, the anti-spoofing programs may detect facial gestures using a combination of yaw and pitch angles. For example, the anti-spoofing programs may detect a diagonal movement of the user's head, which would encompass a simultaneous transition of the yaw and pitch angles between the images. In this manner, techniques of the present disclosure may reduce the occurrence of erroneous authentication caused by spoofing.

Figure 1B:
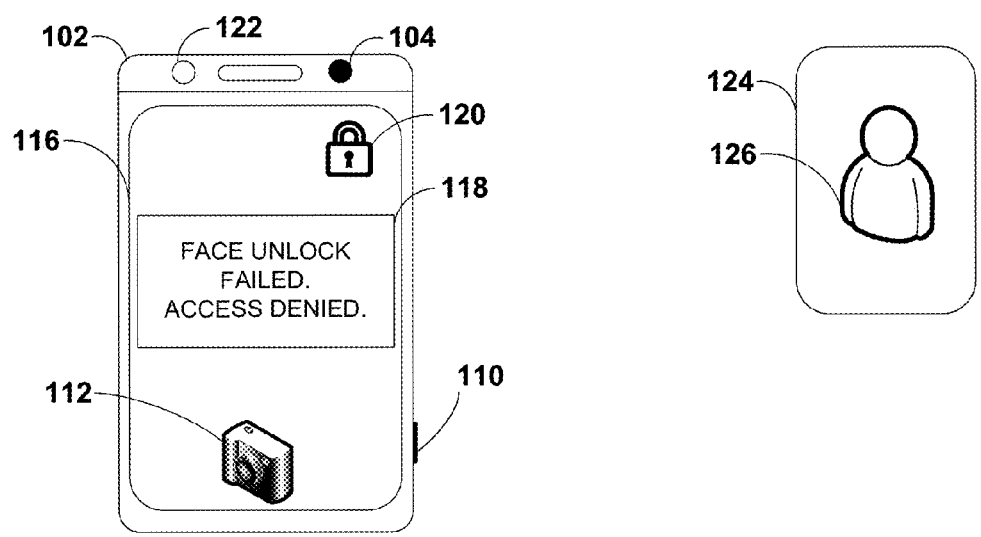

FIGS. 1A-1B are conceptual diagrams illustrating an example computing device for detecting possible spoofing in captured facial images, in accordance with one or more aspects of the present disclosure. FIG. 1A illustrates computing device 102 that may capture facial images associated with a user (e.g., authorized user 126), analyze the captured facial image for possible spoofing, and determine whether to allow or deny authentication based on the analysis. Computing device 102 may include, be, or be part of one or more of a variety of types of devices, such as a mobile phone (including a smartphone), tablet computer, netbook, laptop, desktop, personal digital assistant ("PDA"), set-top box, television, biometric door lock, watch, vehicle ignition, and presence verification device, among others.

Computing device 102 may include camera lens 104 and flashbulb 122. In the example of FIG. 1A, both camera lens 104 and flashbulb 122 may be part of or coupled to a front-facing camera of computing device 102. In other examples, one or both of camera lens 104 and flashbulb 122 may be part of or coupled to a rear-facing camera of computing device 102. One or both of the front-facing and rear-facing cameras may be capable of capturing still images, video, or both. In still other examples, camera lens 104 and flashbulb 122 may be integrated to form a single component of computing device 102.

In the example of FIG. 1A, computing device 102 may include a display device that displays graphical user interface (GUI) 106. GUI 106 may be displayed by a variety of display devices, including input/output capable devices such as a touchscreen or presence-sensitive display. As shown in the example of FIG. 1A, GUI 106 may include one or more GUI elements, such as lock indicator 120, unlock prompt 108, and capture icon 112.

Computing device 102 may be configured to operate in a "locked" mode, shown by lock indicator 120. In some examples, a user may actively configure computing device 102 to operate in locked mode. For example, a user may press a button (such as button 110) for a predetermined length of time to configure computing device 102 to operate in locked mode. In these and other examples, a user may tap, swipe, or otherwise interact with one or more elements of GUI 106, using an input/output capable display of computing device 102. Computing device 102 may also be configured to operate in locked mode by passive means. For example, a predetermined period of "inactivity" may configure computing device 102 to operate in locked mode. Inactivity may occur due to an absence of user interaction (e.g., through button presses, contact with an input/output capable display device, etc.). The predetermined time period that configures computing device 102 to operate in locked mode may be a default time period specified by a manufacturer of computing device 102, or may be programmed by an authorized user, such as authorized user 126.

In some examples, computing device 102 may utilize facial recognition technology to stop operation in locked mode. In other words, authorized user 126 may "unlock" computing device 102 by authentication methods that use facial recognition techniques to determine whether authorized user 126 is an authorized user of device 102. More specifically, authorized user 126 may set up a facial recognition application or embedded process of computing device 102 by storing an enrollment image that represents the face of authorized user 126. Authorized user 126 may cause a camera of computing device 102 to capture the authentication using camera lens 104. Computing device 102 may store the enrollment image to one or more storage devices of computing device 102, and/or to a remote location, commonly known as "cloud storage."

To unlock computing device 102 using facial recognition technology, a user (such as authorized user 126) may provide an authentication image that represents at least a portion of his/her face. In some examples, the user may actively cause a camera of computing device 102 to capture the authentication image. For example, the user may face camera lens 104 and press button 110 to cause the camera to capture the authentication image. In another example, the user may tap, swipe, or otherwise interact with an area associated with capture icon 112 included in GUI 106. In still other examples, computing device 102 may automatically capture the authentication image in response to the user facing camera lens 104. As shown in the example of FIG. 1A, computing device 102 may display GUI 106 to include unlock prompt 108. In this example, unlock prompt 108 indicates that the user may simply face a camera, which may include or be otherwise coupled to camera lens 104, to cause computing device 102 to capture the authentication image. For example, when the user faces camera lens 104, computing device 102 may use a facial recognition program to determine that the image currently captured through camera lens 104 includes a representation of a human face.

Computing device 102 may then compare the captured authentication image with the enrollment image, and determine whether or not the images are sufficiently similar to each other for facial recognition purposes. For example, computing device 102 may utilize one or more facial recognition programs to compare metrics associated with the authentication image to metrics associated with the enrollment image. Some examples of metrics may include distances between facial elements (pupil-to-pupil, mouth width, etc.), contours of various facial features, pixilation corresponding to skin tone or texture, hair and/or eye color, and many others. Facial recognition programs running on computing device 102 may perform the comparison using one or more recognition algorithms, such as geometric and/or photometric approaches, three-dimensional (3D) modeling and recognition techniques, principal component analysis using eigenfaces, linear discriminate analysis, elastic bunch graph matching, pattern matching, and dynamic link matching, to name just a few. Based on comparison-based values, such as preprogrammed acceptable margins of error, facial recognition programs running on computing device 102 may determine whether or not the authentication image and the enrollment image are sufficiently similar to one another for facial recognition. In instances where the facial recognition programs grant a match, the user may successfully unlock computing device 102. Conversely, if the facial recognition programs deny a match, the user may be unable to unlock computing device 102, and computing device 102 may continue to operate in locked mode.

However, an unauthorized user may exploit vulnerabilities of commonly used facial recognition technologies to gain access to unlock computing device 102. For example, if an unauthorized user gains possession of computing device 102 while computing device 102 is configured in locked mode, the unauthorized user may attempt to unlock computing device 102, as solicited by unlock prompt 108. To successfully authenticate, the unauthorized user may spoof one or more facial recognition programs running on computing device 102 by presenting image 124, which includes a visual representation of authorized user 126. Image 124 may take various forms, such as a still photo in printed form, still photo in digital form, or one or more frames of a video. In one example where image 124 is a digital still photo, the unauthorized user may invoke image 124 using a second computing device (not shown for purposes of ease of illustration). For example, the unauthorized user may use the Internet to access a profile picture that authorized user 126 posted to a social networking website. Using image 124, an unauthorized user may attempt to spoof the facial recognition programs running on computing device 102 and illicitly unlock computing device 102.

Computing device 102 may implement techniques of this disclosure to detect attempts to spoof the facial recognition programs using image 124. In many cases, a legitimate facial image (i.e., captured from an actual human face, rather than a reproduced image) will include a glint in one or both eyes. More specifically, a legitimate facial image may display a glint in the cornea (front-facing portion) of one or both eyes.

In some instances, computing device 102 may use a flashbulb to induce corneal glint in a legitimate facial image. In cases where an unauthorized user attempts to spoof the facial recognition programs running on computing device 102 (e.g., using image 124), the captured facial image may include diminished or no corneal glint, or, in the case of image 124 being a video representation of the user, the timing of the appearance of corneal glint may correspond to an expected timing based on the timing of the flashbulb. Computing device 102 may implement techniques of this disclosure to determine whether or not a captured facial image includes appropriate corneal glint to constitute a legitimate facial image. If computing device 102 determines that a captured facial image does not include appropriate corneal glint, computing device 102 may detect a spoofing attempt, and denying authentication of the user prior to even performing facial recognition techniques. In this manner, computing device 102 may implement techniques of this disclosure to prevent erroneous authentication by spoofing.

FIG. 1B is a conceptual diagram illustrating the behavior of computing device 102 after computing device 102 detects an attempt to cause erroneous authentication by spoofing. As discussed, an unauthorized user may attempt to spoof facial recognition programs running on computing device 102 using image 124 that represents authorized user 126. Computing device 102 may implement one or more techniques of this disclosure to detect an attempt to spoof, and deny authentication by facial recognition based on the detection. As shown in FIG. 1B, computing device 102 may display failure notification 118 within modified GUI 116. In this example, failure notification 118 merely indicates that an attempt to authenticate by facial recognition failed, and that computing device 102 has denied access to a user who attempted to unlock computing device 102 using image 124. In other examples, computing device 102 may display a more detailed notification, e.g. a notification that identifies spoofing as a suspected reason behind the failure to authenticate.

As discussed, a legitimate facial image may include an indication of corneal glint. Computing device 102 may use flashbulb 122 or a temporarily brightened display to induce the corneal glint, natural and/or artificial light from a user's surroundings may cause the corneal glint, or any combination thereof. In other implementations, computing device 102 may use light sources other than flashbulb 122 to induce corneal glint. Computing device 102 may use these other light sources either in place of, or in addition to flashbulb 122. Examples of other light sources include an infrared emitter (such as those used in infrared proximity sensors), light emitting diodes (such as those used in LED-based proximity sensors), and display device(s) of computing device 102. As discussed, computing device 102 may temporarily brighten a display device, such as a touchscreen of a smartphone, in order to induce the corneal glint. Additionally, computing device 102 may emit light that is of sufficient brightness to induce corneal glint, but not so bright as to overexpose or "wash out" the authentication image.

In some examples, computing device 102 may vary the brightness of the emitted light based on ambient light in the surroundings of the subject of the authentication image, a technique known as adaptive brightness adjustment. To accomplish adaptive brightness adjustment, computing device may be equipped with a dedicated ambient light sensor. Using the dedicated ambient light sensor, computing device 102 may discern a brightness of the surroundings of the subject of the authentication image. Based on the discerned brightness, computing device 102 may vary the brightness of the light beam(s) emitted by flashbulb 122 and/or the other light sources described above.

In some implementations, computing device 102 may use a technique known as "time modulation" to enhance robustness of the anti-spoofing techniques described herein. To implement time modulation, computing device 102 may initiate emissions of multiple light beams using flashbulb 122 and/or other light sources. Computing device 102 may cause flashbulb 122 to emit the multiple light beams, at predetermined and/or randomly generated time intervals. Computing device 102 may then capture authentication images associated with some or all of the multiple emitted light beams, and check for corneal glint in each captured authentication image. If computing device 102 does not detect sufficient glint in a certain number of the captured images (e.g., all of the captured images, or a threshold number within the total number of images), computing device 102 may deny authentication of the user based on detected spoofing. In this manner, techniques of this disclosure may incorporate time modulation to enhance and add robustness to the anti-spoofing measures described herein.

To determine whether a captured facial image is legitimate or spoof-based, computing device 102 may detect corneal glint in the captured facial image and/or analyze the corneal glint. In one example, computing device 102 may use flashbulb 122 to initiate an emission of a light beam, commonly known as a "flash." Under conditions such as dim lighting, the flash may induce a corneal glint that is present in a legitimate facial image, where the corneal glint might otherwise be absent or diminished. Computing device 102 may then determine whether the captured facial image includes sufficient corneal glint to constitute a legitimate facial image. In various situations, the corneal glint may include, or be entirely, a reflection of the flash.

Computing device 102 may detect and analyze the corneal glint in a variety of ways. In one example, computing device 102 may measure or estimate the intensity of reflection that causes the corneal glint. The intensity may derived from and/or directly proportional to optical measurements such as luminance, luminosity, luminous intensity, illuminance, luminous emittance, radiant intensity, irradiance, radiance, and others. Computing device 102 may then compare the intensity to a threshold intensity associated with one or more known legitimate facial images. If the intensity of the captured corneal glint is less than the threshold intensity, computing device 102 may recognize the captured facial image to be spoof-based, and decline to evaluate the captured facial image for facial recognition-based authentication.

In various implementations, computing device 102 may detect spoofing attempts by detecting an indication of liveness from the user. In some such implementations, computing device 102 may run facial recognition programs on the captured authentication image prior to attempting to detect a liveness gesture. By performing facial recognition analysis prior to analyzing the subject for liveness indications, computing device 102 may determine that the user (e.g., authorized user 126) has adequate authentication permissions to access functionalities controlled by computing device 102 before checking for a possible spoofing attempt. In other such implementations, computing device 102 may first detect indications of liveness from the subject of the authentication image, and subsequently perform facial recognition on the authentication image. By testing for liveness before performing facial recognition, computing device 102 may eliminate possible spoof-based images before running the facial recognition programs. In other example implementations, computing device 102 may perform facial recognition analysis concurrently with analyzing the subject for liveness indications, i.e., at the same time in parallel. At various instances, the term "liveliness" may be used in place of "liveness." For purposes of this disclosure, the terms "liveliness" and "liveness" may be considered synonymous and may be used interchangeably. More specifically, the terms "liveness" and "liveliness" may each be used herein to denote the distinction between an inanimate object (e.g., an image or other likeness used for spoofing) and a live person.

Computing device 102 may consider various criteria in choosing a particular sequence in which to perform facial recognition and liveness detection. In some examples, the facial recognition programs and anti-spoofing programs may take different amounts of time to execute, may expend different levels of computing resources, require different amounts of network and/or cellular bandwidth, etc. As one example, in an implementation where the anti-spoofing programs perform both glint detection as well as liveness detection, execution of the anti-spoofing programs may be more time-consuming and/or resource-expensive than execution of the facial recognition programs. In this example, computing device 102 may perform facial recognition prior to detecting indications of liveness.

As a converse example, the anti-spoofing programs may run the liveness detection techniques of this disclosure and may not perform glint detection. In such an implementation, execution of the anti-spoofing programs may be less time-consuming and/or resource-expensive than execution of the facial recognition programs. In this scenario, computing device 102 may run the anti-spoofing programs (i.e., perform liveness detection) prior to performing facial recognition analysis on the captured authentication image. In this manner, computing device 102 may conserve time and computing resources by varying the sequence in which computing device 102 performs liveness detection and facial recognition. Liveness detection as described in the preceding paragraphs may be based on detecting one or both of liveness gestures and facial gestures, as described below.

In some examples, computing device 102 may detect indications of liveness based on a user's performance of one or more gestures. Gestures from which computing device 102 detects liveness may be referred to herein as "liveness gestures." Some illustrative examples of liveness gestures may include movement of the user's head in one or more directions. For example, a user may "shake" or "turn" his/her head, thereby rotating the head around a vertical (or y-) axis. The rotational angle created by the shaking/turning gesture may be known as a "yaw" or "heading" angle.

Similarly, in other examples of liveness gestures, a user may "nod" his/her head by rotating the head around a horizontal (or x-) axis. The rotational angle created by the nodding gesture may be known as a "pitch" or "elevation" angle. Yaw and pitch angles are often classified as Tait-Bryan angles, which, in turn, are a subset of Euler angles. In general, Euler angles may be used to discern or describe the orientation of a rigid body. For example, in the context of facial images, a yaw angle may describe to what extent a subject's head is turned to the right or left. Similarly, a pitch angle may describe to what extent the subject's head is faced upward or downward. The third and final Tait-Bryan angle is often referred to as "roll" or "bank" and may describe rotation of a user's head around a depth (or z-) axis, and reflect a "cocking" motion of the user's head.

A facial image may display some level of any one or more of the described Tait-Bryan angles. For example, if a subject faces upward and turns his/her head to the left, a corresponding facial image of the subject may display both a yaw angle as well as a pitch angle. Anti-spoofing programs running on computing device 102 may implement techniques of this disclosure to determine yaw, pitch, and roll angles of a subject's head as represented in a facial image, and use the determined angles to detect the presence of various types of liveness gestures. If the detected liveness gesture(s) satisfy certain parameters (such as meeting a threshold magnitude, matching a predetermined gesture nature, etc.), the anti-spoofing programs may determine that the captured authentication image is legitimate. Conversely, if the anti-spoofing programs do not detect a liveness gesture, or detect a liveness gesture that does not satisfy the parameters, the anti-spoofing programs may identify the authentication attempt as a spoofing attempt, and cause computing device 102 to deny access to the user, irrespective of the execution of and/or results generated by the facial recognition programs.

The anti-spoofing programs running on computing device 102 may detect a liveness gesture in a variety of ways. For example, the anti-spoofing programs may cause computing device 102 to capture multiple facial images of a user who attempts to access functionalities controlled by computing device 102. The anti-spoofing programs may then detect a liveness gesture based on one or both of a yaw angle and a pitch angle of one of the captured multiple facial images relative to another of the captured multiple facial images. For example, if a second image of the captured multiple facial images displays a yaw angle relative to a first image of the captured multiple facial images, the anti-spoofing programs may detect that the user has turned his/her head to the right or left, as the case may be. As another example, if the second image displays a pitch angle relative to the first image, the anti-spoofing programs may detect that the user has nodded his/her head in either an upward or downward direction, as the case may be. One or both of the head-turn and the head-nod may form liveness gestures, as per one or more of the techniques described herein.

Based on the yaw and/or pitch angles displayed by the second image relative to the first image, the anti-spoofing programs running on computing device 102 may discern a yaw angle magnitude and/or pitch angle magnitude. For example, a half-turn of the user's head to the user's right side may cause the second image to display a yaw angle having a magnitude of 45 degrees relative to the first image. Similarly, a half-nod of the user's head in an upward direction may cause the second image to display a pitch angle having a magnitude of 45 degrees relative to the first image.

In this example, the anti-spoofing programs running on computing device 102 may generate a liveness score based on one or both of the yaw angle magnitude and the pitch angle magnitude. For example, the anti-spoofing programs may generate a liveness score that is proportional to the determined yaw angle magnitude and/or pitch angle magnitude. In other words, a greater yaw angle magnitude and/or pitch angle magnitude may result in a greater liveness score. In examples where the anti-spoofing programs detect both a yaw angle as well as a pitch angle displayed by the second image relative to the first image, the liveness score may result from a function of both the yaw angle magnitude and the pitch angle magnitude. In various scenarios, the anti-spoofing programs may attach different weights to the yaw angle magnitude than to the pitch angle magnitude. In one such example, if the yaw angle magnitude is associated with a higher weight than the pitch angle magnitude, then even a slight yaw angle magnitude may cause a more sizeable increase in the liveness score than does a greater pitch angle magnitude.

Additionally, the anti-spoofing programs running on computing device 102 may compare the generated liveness score to a threshold value. For example, the threshold value may correspond to a liveness score that is associated with a threshold liveness gesture of a preselected magnitude (yaw angle, pitch angle, or both). The anti-spoofing programs may determine that the threshold liveness gesture has a nature and/or magnitude that cannot be spoofed easily. For example, the anti-spoofing programs may disregard any liveness indications that may be discerned from a roll angle, because a two-dimensional spoof based image (such as image 124) may exhibit roll when rotated around its center. As another example, the anti-spoofing programs may disregard liveness indications based on yaw and/or pitch angle magnitudes that are below a certain value. By disregarding yaw and/or pitch angle magnitudes below a certain value, the anti-spoofing programs may detect spoofing in scenarios where a malicious user may present multiple spoof-based images of authorized user 126 that display minimal, though discernible, variation from one another.

Based on the comparison of the generated liveness score to a threshold value, the anti-spoofing programs running on computing device 102 may determine whether to deny authentication to the user with respect to accessing functionalities controlled by the computing device. More specifically, if the liveness score generated from the multiple facial images does not meet the threshold value, the anti-spoofing programs may cause computing device 102 to deny authentication to the user. Denial of authentication may be independent of the performance and/or results of facial recognition analysis on any one or more of the multiple facial images. For example, in a scenario where computing device 102 executes the facial recognition programs prior to executing the anti-spoofing programs, computing device 102 may deny authentication even if one or more of the multiple facial images is granted a match by the facial recognition programs. As another example, in a scenario where computing device 102 executes the facial recognition programs subsequent to executing the anti-spoofing programs, computing device 102 may deny authentication and decline to execute the facial recognition programs on any of the multiple facial images. By declining to execute the facial recognition programs in this implementation, computing device 102 may conserve time, computing resources, network resources, etc.

In some examples, the anti-spoofing programs may cause computing device 102 to prompt the user to perform one or more liveness gestures. In one implementation, the anti-spoofing programs may cause unlock prompt 108 to include an instruction to perform one or more liveness gestures. In another implementation, the anti-spoofing programs may cause computing device 102 to display a separate prompt within GUI 106, such that the separate prompt includes instructions to a user to perform the liveness gesture(s). In these and other implementations, the anti-spoofing programs may cause computing device 102 to output an audio prompt, such as by using a speaker of computing device 102. Similar to the visual prompts provided as part of GUI 106, the audio prompt may instruct the user to perform one or more liveness gestures.

Additionally, the anti-spoofing programs may predetermine the liveness gestures for a user to perform, and/or randomly select the one or more liveness gestures from a bank or pool. As one example, the anti-spoofing programs may prompt the user to perform a liveness gesture that includes a half-turn of the user's head in a left direction. More specifically, the half-turn may include turning the user's head from a front-facing (or "frontal") orientation to the user's left, thereby creating a yaw angle of between 35 and 55 degrees. The orientation of the user's head after a half-turn may be referred to as a "mid-profile" orientation herein.

As another example, the anti-spoofing programs may prompt the user to perform a full-turn of the user's head in a right direction. The full-turn may include turning the user's head from the frontal orientation to the user's right, resulting in a yaw angle of between 80 and 100 degrees. The orientation of the user's head after a full-turn may be referred to herein as a "profile" orientation. Upon detecting a liveness gesture from the user, the anti-spoofing programs may determine whether the performed liveness gesture adequately matches the predetermined liveness gesture specified in the prompt. For example, if the anti-spoofing programs prompt the user to perform a half-turn, but the anti-spoofing programs instead detect that the user has performed a full-turn, the anti-spoofing programs may determine that the detected liveness gesture does not match the predetermined liveness gesture.

In a situation where the detected liveness gesture does not match the predetermined liveness gesture, the anti-spoofing programs may cause computing device 102 to deny authentication to the user, independently of any performance of and/or results generated by the facial recognition programs with respect to facial images of the user. Conversely, if the anti-spoofing programs determine that the detected liveness gesture matches the predetermined liveness gesture, the anti-spoofing programs may defer any authentication determinations to the facial recognition programs (e.g., granting authentication if the facial recognition programs determine a match for the user's authentication image, etc.).

The anti-spoofing programs may discern the yaw angle (thereby detecting the liveness gestures indicated in the prompt) by causing computing device 102 to capture two facial images of the user. In one implementation, the anti-spoofing programs may cause computing device 102 to prompt the user at each stage of the liveness gesture. In the example of the left half-turn, the anti-spoofing programs may prompt the user to submit a facial image with the user's head in a frontal orientation. Subsequent to capturing a first image of the user's face in frontal orientation, the anti-spoofing programs may prompt the user to turn his/her head to the left, by an angle ranging from 35 to 55 degrees. The anti-spoofing programs may then cause computing device 102 to capture a second image of the user's face, and compare the second image to the first image to detect the left half-turn.

In some examples, the anti-spoofing programs may cause computing device 102 to capture the second image after a predetermined lapse of time after capturing the first image. In other examples, the anti-spoofing programs may prompt the user to cause computing device 102 to capture one or both images, such as by pressing/actuating a button provided in GUI 106. In still other examples, the anti-spoofing programs may cause a video-capable camera of computing device 102 to capture a video stream of the user, and extract frames of the captured video to form the first and second images. In this manner, techniques of this disclosure may provide a variety of ways by which to obtain facial images from which to detect liveness gestures.

The anti-spoofing programs may compare the first and second images in various ways in order to detect liveness gestures. Example detection implementations may include pose-based detection techniques, landmark-based detection techniques, and others. Pose-based and landmark-based detection techniques are described in more detail with respect to FIGS. 7-10 below. Additionally, certain aspects that form the basis of pose-based detection techniques include pose identification techniques. Example techniques for pose identification (or alternatively, identification of head orientations)

are described in U.S. Pat. Nos. 6,829,384, "OBJECT FINDER FOR PHOTOGRAPHIC IMAGES," 7,194,114, "OBJECT FINDER FOR TWO-DIMENSIONAL IMAGES, AND SYSTEM FOR DETERMINING A SET OF SUB-CLASSIFIERS COMPOSING AN OBJECT FINDER," and 8,064,688, "OBJECT RECOGNIZER AND DETECTOR FOR TWO-DIMENSIONAL IMAGES USING BAYESIAN NETWORK BASED CLASSIFIER," each of which are incorporated herein in their respective entireties.

In some implementations, computing device 102 may include or otherwise have access to hardware elements that enable implementation of the techniques of this disclosure. For example, computing device 102 may include or be coupled to a three-dimensional (3-D) rangefinder. The 3-D rangefinder may be incorporate technologies such as lasers to determine distances to remote objects, depth of remote objects, etc. In some examples where computing device 102 uses a 3-D rangefinder to implement liveness gesture detection, computing device 102 may detect distances and depths associated various facial contours with respect to the first and second images. For example, in conjunction with the capture of the first facial image, computing device 102 may use the 3-D rangefinder to discern one or more of a distance to the tip of the user's nose, the distance to an eye of the user, etc. Additionally, in conjunction with the capture of the second facial image, computing device 102 may use the 3-D rangefinder to discern the distances to the same facial features.

Based on the nature of the performed liveness gesture, the anti-spoofing programs may expect certain changes in the distances to the facial features. For example, in the case a right full-turn, the distance to the tip of the user's nose may increase, based on the difference between a frontal and profile orientation of the user's head. Additionally, the 3-D rangefinder may detect less contours when the user's head is posed in a profile orientation as compared to when the user's head is posed in a frontal orientation. More specifically, posing in a frontal orientation may expose contours associated with the depth and curvature of both eyes, protrusion of the nose, mouth/lips, chin, and others. In comparison, posing in a profile orientation may lack the contours associated with one eye (which may not be visible), reduce contours associated with the remaining visible eye, etc. In this manner, techniques of this disclosure may be implemented and enhanced through the use of a 3-D rangefinder.

In some examples, the anti-spoofing programs may cause computing device 102 to select two or more images from a larger subset of images, and then detect the liveness gesture using the selected images. In one illustrative example, the anti-spoofing programs may cause computing device 102 to capture three facial images of the user. The anti-spoofing programs may then permute every possible pair from the three captured facial images, and compare the images within each pair. If the anti-spoofing programs detect a satisfactory liveness gesture based on one of the comparisons (i.e., in a single pair of captured facial images), the anti-spoofing programs may defer to the facial recognition programs with respect to authentication of the user.

In instances where computing device 102 is equipped with or coupled to an image capture device with video capture capabilities, the anti-spoofing programs may select the first and second images from several frames of a captured video stream. In one illustrative example, the anti-spoofing programs may permute subsets (e.g., pairs, triads, etc.) of frames of the captured video stream. The anti-spoofing programs may then compare the frames within each subset. Based on the comparisons, the anti-spoofing programs may detect a liveness gesture in one or more subsets. For example, a pair of captured frames may exhibit sufficient pitch to indicate an upward nod. As another example, a triad of captured frames may exhibit yaw necessary to indicate a left half-turn that then transitions to a left full-turn. In yet another example, a quartet of captured frames may exhibit yaw and pitch sufficient to indicate a right half-turn, followed by an upward nod, followed by a right full-turn. In this example, the fourth frame of the quartet may display a pitch angle as well as a yaw angle of between 80 and 100 degrees when compared to the first frame of the quartet.

In some examples, the anti-spoofing programs may calculate liveness scores associated with various subsets of frames, and select a particular subset based on the liveness score. For instance, the anti-spoofing programs may select a pair of frames if the liveness score for the pair corresponds to a liveness gesture that is satisfactory to the anti-spoofing programs. In this manner, techniques of this disclosure may enable detection of liveness gestures by selectively grouping frames/images of a larger superset of frames/images.

In some examples, the anti-spoofing programs may implement techniques of this disclosure to collaboratively function with the facial recognition programs to provide a more robust authentication mechanism. For example, the anti-spoofing programs may cause the facial recognition programs to determine whether the first and second images display sufficient similarity to indicate a consistent user identity. More specifically, in conjunction with the anti-spoofing programs detecting a liveness gesture using the first and second images, the facial recognition programs may analyze the first and second images to determine whether the images match for purposes of identity verification. In some examples, the match may be based on whether or not a similarity score of the images meets a threshold similarity (or "similarity score threshold"). In these and other examples, computing device 102 may determine whether the facial images conform to a consistent user identity by comparing one or characteristics of the first image to one or more corresponding characteristics of the second image. Examples of such characteristics may include iris color, dimensions of facial features such as an eye nose, mouth, etc., hair color, and head dimensions, to name a few. In this manner, techniques of this disclosure may detect spoofing attempts while also guarding against malicious users who may attempt to replicate a liveness gesture by using spoof-based images of different people.

In certain implementations, computing device 102 may perform the anti-spoofing techniques of this disclosure using facial gesture detection and/or recognition. As discussed, the anti-spoofing techniques described herein may use facial gestures (or alternatively, "face gestures") such as blinks, winks, and other gestures that may be performed within the confines of a human face. Computing device 102 may detect facial gestures associated with various facial features. Examples include one or both eyes (e.g., for blinks, winks, etc.), the mouth area (e.g., for gestures including smiling, frowning, displaying a user's teeth, extending a user's tongue, etc.), the nose (e.g., for a nose wrinkle gesture, etc.), the forehead (e.g., for a forehead wrinkle gesture, etc.), one or both eyebrows (for eyebrow raise and compression gestures, etc.), and various others.

In some implementations, computing device 102 may detect facial gestures based on certain facial landmarks. In specific examples, computing device 102 may identify facial landmarks in the multiple captured facial images. In particular, computing device 102 may identify one or more landmarks in the first facial image, and identify one or more corresponding landmarks in the second facial image. Additionally, computing device 102 may extract sub-images from each of the first and second facial images, such that the sub-images include representations of the identified landmarks. Computing device 102 may then compare corresponding sets of sub-images from the first and second facial images (e.g., by determining a distance measure between the sub-images). If the distance measure meets or exceeds a threshold value, computing device 102 may determine that the user has performed the facial gesture satisfactorily, and, contingent on the facial recognition programs granting a match, allow the user to access functionalities controlled by computing device 102 based on facial recognition authentication.

In one example, computing device 102 may attempt to detect a blink gesture. In this example, computing device 102 may identify both eyes of the first facial image as individual landmarks. Alternatively, computing device 102 may identify, as a single landmark, a region of the user's face (e.g., an "ocular strip") that includes both eyes. Computing device 102 may extract a first sub-image from the first facial image that includes the identified facial landmark(s). Additionally, computing device 102 may extract a second sub-image from the second facial image that includes the corresponding facial landmark(s). In some implementations, computing device 102 may extract the sub-images such that the second image is larger than the first sub-image (e.g., by a factor of 20% of the first image's size). Computing device 102 may extract the second sub-image as a larger image in an attempt to ensure that all details of the first sub-image are included in the second sub-image. Additionally, by extracting the second sub-image as a larger image than the first sub-image, computing device 102 may ensure a more accurate and precise alignment of corresponding landmarks between the two sub-images. By ensuring a better alignment of corresponding landmarks in this manner, computing device 102 may mitigate any distances caused by poor alignment and other factors that are irrelevant to the performance of a liveness gesture or a facial gesture.

To detect whether the user has performed a facial gesture sufficient for anti-spoofing purposes, computing device 102 may compute a distance measure between the first and second sub-images. Computing the distance measure, in examples, may include various steps. For example, computing device 102 may scale, rotate, correct, or otherwise adjust one or both of the extracted sub-images in order to normalize the extracted sub-images. Adjusting (and/or normalizing) the extracted sub-images in this fashion may enable computing device 102 to obtain a standard normalized correlation of the sub-images. By normalizing the sub-images, computing device 102 may reduce discrepancies in shared attributes of the sub-images, such as locations of and spaces between areas that form measurement parameters. In examples, computing device 102 may rotate one of the sub-images based to compensate for one or more of yaw, pitch, and roll angles displayed by the second facial image relative to the first facial image. In the rotation example, computing device 102 may normalize an orientation of the sub-images. Similarly, computing device 102 may scale one or both sub-images to normalize a size of the sub-images. Computing device 102 may normalize the size of the sub-images based on detected discrepancies in the sizes of the first and second facial images. In this manner, computing device 102 may reduce differences between the sub-images that are irrelevant to the user's performance of the facial gesture, prior to attempting to detect the facial gesture from the sub-images.

To determine whether the user has performed the facial gesture (in this example, a blink), computing device 102 may measure the distance between the sub-images. In instances where computing device 102 performs multiple normalization operations on the sub-images, computing device 102 may measure the distances from the first sub-image to each normalized version of the second sub-image. Computing device 102 may then select, for blink detection purposes, the minimum distance of the multiple distance measures. By selecting the minimum distance, computing device 102 may utilize the distance from the most accurately normalized pair of sub-images. Computing device 102 may then determine whether the measured distance (e.g., the selected minimum distance) indicates a sufficient difference between the sub-images to qualify as an adequate blink (or other facial gesture, as the case may be). In examples, computing device 102 may compare the measured distance to a threshold value, in order to determine whether the sufficient difference exists. If the measured distance meets or exceeds the threshold value, computing device 102 may detect a blink gesture, while if the measured distance is below the threshold value, computing device 102 may detect an absence of (or a failed) blink gesture.

Computing device 102 may measure the distance between the sub-images based on differences between corresponding pixel locations of the sub-images. In the example of the blink gesture described above, corresponding pixel locations of the first and second sub-images may represent portions of the corneas and the eyelids, respectively. Additionally, the eyelids may include less pixel transitions than the corneas. More specifically, a cornea may display pixel transitions (e.g., contrasting colors) with respect to two or more of the sclera, iris, and pupil. Conversely, an eyelid may display pixel transitions only at its upper bound (relative to the eyebrow) and lower bound (relative to the eyelash).

In some example implementations, computing device 102 may detect a blink gesture using three facial images (and three sub-images, one extracted from each of the three facial images). In these implementations, computing device 102 may measure distances between any two of the three sub-images to detect the blink gesture. For example, computing device 102 may detect the blink gesture if the measured distances satisfy a set of parameters. As one example parameter, the measured distance between the first and second sub-images must meet or exceed the threshold value (to correspond with a closing of the eyelids). As another example parameter, the measured distance between the first and third sub-images must be below the same or different threshold value (to correspond with both sub-images representing open eyes). As another example parameter, the measured distance between the second and third sub-images must meet or exceed the same or different threshold (to correspond with an opening of the eyelids). Computing device 102 may apply all three or any combination of these parameters in using three facial images to detect a blink gesture. In this manner, techniques of this disclosure may provide a variety of ways to detect facial gestures with varying amounts of available information.

As discussed, computing device 102 may implement techniques of this disclosure to detect a variety of facial gestures. In addition to the blink gesture described above, computing device 102 may implement the techniques to detect other facial gestures that use one or both eyes as landmarks, such as winks, movement of the corneas while the eyes are open (hereinafter "ocular movement"), eyebrow movements, etc. Additionally, computing device 102 may detect facial gestures based on other facial landmarks, including the mouth (or general mouth area), nose, forehead, and others. Facial gestures associated with these landmarks may include, for example, a smile, a frown, a tongue protrusion, an open mouth gesture, a nose wrinkle, a forehead wrinkle, and various others.

In the example of a wink gesture, computing device 102 may compare the distance measured with respect to one eye (e.g., the left eye) to a first threshold value to determine whether a sufficient difference exists to indicate an open-shut-open movement of the left eyelid. In conjunction with detecting the sufficient difference with respect to the left eye, computing device 102 may detect a static condition of the right eye (e.g., a continuously open state of the right eyelid). More specifically, computing device 102 may measure the distance between the representations of the right eye in the various facial images, and compare the distance to a second threshold. In the case of the right eye, computing device 102 may determine whether the distance is less than the second threshold. In other words, in the case of the right eye, computing device 102 may detect whether a sufficient similarity exists across the various facial images. The sufficient similarity may indicate that the right eye remains in a static state (i.e., open, or closed, but without a transition between the two).

When using the mouth as a landmark, computing device 102 may, as discussed, detect facial gestures including smiles, frowns, tongue protrusions, and open mouth gestures. As one specific example, computing device 102 may detect an open mouth smile. In the example of the open mouth smile, the facial images may display a transition from a beginning point (e.g., with the mouth in a closed state, and in a relatively straight or non-expressive position) to an ending point (e.g., with the mouth in an open state, in an upward-curving position). In this example, the open state of the user's mouth in one of the facial images (e.g., a second facial image) may provide an addition difference (thereby increasing the measured distance) relative to a facial image that represents a closed mouth. For instance, the open mouth of the second facial image may include pixel transitions caused by contrasts between the lips and the teeth. Conversely, the first facial image may include fewer, or no pixel transitions associated with the lips-to-teeth contrast, owing to the closed state of the user's mouth. As a result of the differing quantities and/or qualities of the pixel transitions associated with the mouth landmark, a sufficient difference (i.e., distance) may exist between the facial images to indicate the open-mouth smile facial gesture. Other examples of facial gestures that may cause the sufficient difference with respect to the mouth landmark may include other types of smiles (e.g., closed mouth), frowns (e.g., due to a differing curvature of the mouth region), tongue protrusions (e.g., resulting from pixel transitions caused by depth differences, etc.), opening of the mouth (e.g., resulting from pixel transitions caused by contrast between the lips and a representation of an open mouth), and others.

In some implementations, computing device 102 may implement techniques of this disclosure to prompt a user to perform a particular predetermined facial gesture. In examples, computing device 102 may prompt the user outputting a notification, similar to notification 108 of GUI 106. In these implementations, computing device 102 may detect a valid facial gesture for anti-spoofing purposes only if the detected facial gesture matches the predetermined facial gesture. As discussed, an open-mouth smile may be a valid facial gesture to indicate liveness under several circumstances. However, if the predetermined facial gesture indicated in the prompt is not an open-mouth smile, computing device 102 may deny authentication to a user who performs an open-mouth smile. Conversely, if the detected facial gesture matches the predetermined facial gesture (e.g., a tongue protrusion), computing device 102 may grant authentication to the user, assuming that the facial recognition programs have granted a match to at least one of the captured facial images.

Additionally, computing device 102 may, in some implementations, be equipped with face detection capabilities. In specific examples, computing device 102 may run or execute one or more facial detection programs. As discussed, computing device 102 may include or be otherwise coupled to an image capture device with video capture capabilities. In turn, computing device 102 may receive multiple images (including the described facial images) as separate frames of a video stream captured by the image capture device. In such implementations, the face detection programs may analyze multiple frames (and sometimes all frames) of the captured video stream. More specifically, the face detection programs may analyze images and/or video frames to determine whether an image/frame includes a representation of a human face. In implementations where computing device 102 is equipped with such face detection programs, computing device 102 may perform face detection on multiple frames of the captured video stream to determine legitimacy of a detected facial or liveness.

For example, computing device 102 may perform face detection on each frame of the captured video stream. If the face detection fails with respect to any portion of the video stream (i.e., if at least one frame of the video stream does not include the representation of the human face), computing device 102 may deny authentication to the user. In other examples, the face detection programs may define an acceptable threshold of frames in which a human face may be absent. In these examples, computing device 102 may grant authentication to a user in instances where frames of the video stream fail the face detection analysis, but where the number of failed frames does not exceed the defined threshold. In this manner, techniques of this disclosure may thwart attempts by a malicious user to spoof a facial or liveness gesture by retrieving multiple images of an authorized user showing different facial expressions, head orientations, etc.

Example algorithms by which one or more techniques of this disclosure may be performed are presented below, with a listing of variables and the respective values they denote.

Algorithm 1: Anti-Spoofing

1. Run face detection and recognition on image frames as they are output from the video camera. When a face F matches the enrollment faces add it to the end of set E={F1, F2, F3, . . . , FN} of recognized faces. Note that the detection step yields face landmark locations and an estimate of the roll angle for the face.

2. If N (the number of faces in set E) is less than 2, goto Step 1, otherwise continue to 3.

3. Compute liveness L(E) according to Algorithm 2.

4. If L(E)==True, unlock the device.

5. If recognition time expires, clear set S and stop; otherwise go to Step 1. Algorithm 2: Liveness measure L(E)

1. N=the number of elements in face set E. For each i from 1 to N-1, compare Face i to new Face N to check for factors that can confound feature comparison as follows a. Check for excessive relative rotational using the head roll rotation estimate from the face detection step. For each 1 from i to N-1, compare Face i to the new Face N:

If Abs(RN-Ri)>Rmax, where Ri is the roll angle of face i, return False, otherwise continue.

b. Check for motion blur using the landmark positions pij from the face detection step:

i. Compute the centroid cN of the landmarks for the new face FN: $cN = 1/3 \sum_{j=1}^{3} pNj$ ii. If $||cN-ci||>Vmax$, i.e. the distance between the two faces exceeds a threshold, return False, otherwise continue.
c. Check for excessive relative scale using the landmark positions pij from the face detection step:
  i. Compute the scale SN of the new face FN: $SN=1/3_{j=1}\Sigma^3||cN-pj||$, i.e. the average distance of the landmark from the centroid of the landmarks
  ii. If Max(SN/Si, Si/SN)>Smax, return False, otherwise continue.
2. Rotate the Face image to nominal position (i.e. such that the line between eye points is horizontal)
3. Scale the Face image to a nominal size
4. For each feature j, define a sub-image of the face image, centered about landmark position pj, of size $M*Wjx, M*Wjy$ (padded by factor M)
5. For each 1 from i to N-1, compare the features of Face i to Face N.
  a. For each feature j (both eyes, or mouth):
    i. Correlate a smaller (size Wjx,Wjy) sub-image Iij of Face Fj with corresponding sub-image from face FN. For each possible position of the smaller image within the larger compute a dissimilarity measure (e.g. normalized Euclidean distance, 1−correlation coefficient) to define a correlation plane.
    ii. Find the minimum of the dissimilarity measure over the correlation plane.
  b. Determine liveness from the dissimilarity measures of the features. E.g. Liveness=True if the dissimilarities of all features is greater than distance threshold DL and False otherwise.
  c. If Liveness is True for Face Fj, return true, otherwise continue step 5 with j=j+1;
6. return False

| Functions and variables | |
| --- | --- |
| E | set of all faces F in an unlock sequence that match the enrollment faces |
| L(E) | liveness measure; higher numbers indicate higher liveness |
| pij | landmark coordinates (x,y) for features of Face i; j = 1 for left eye, j = 2 for right eye, j = 3 for mouth |
| cij | centroid of landmarks for Face i; $cN = \frac{1}{3} j = 1\Sigma 3$ Pn |
| Vi | face velocity magnitude for Face i, $V = Max(||ci - ci - 1||, ||ci - 1 - ci + 1||)$; TODO: add measure for change in scale? |
| Ij | image of feature j |

| Parameters | | |
| --- | --- | --- |
| DL | distance threshold | 0.1 |
| Vmax | velocity magnitude threshold, above this the face may have motion blur | 5-10 |
| Rmax | rotation threshold, if the the relative rotation of the 2 faces is larger, do not compare features | 5 degrees |
| Smax | scale threshold, if the the relative scale of the 2 faces is larger, do not compare features | 1.1 |
| Wjx,Wjy | feature window size in pixels | 0.5, 0.4 |
| M | eye window factor | 1.2 |

Figure 2:
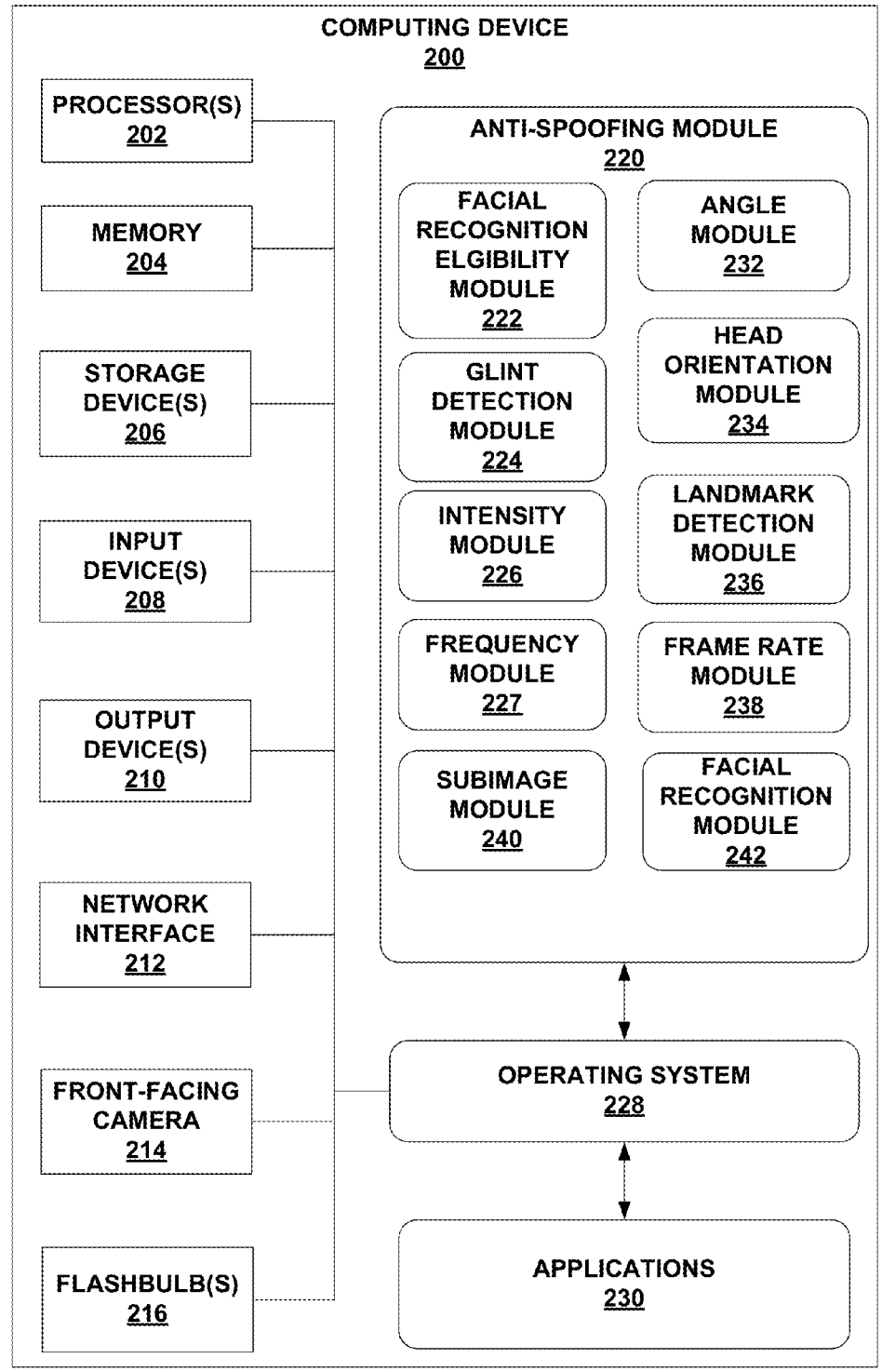
FIG. 2 is a block diagram illustrating details of an example computing device for detecting possible spoofing in captured facial images, in accordance with one or more aspects of this disclosure.

FIG. 2 is a block diagram illustrating details of an example computing device for detecting possible spoofing in captured facial images, in accordance with one or more aspects of this disclosure. Computing device 200 may be one non-limiting example of computing device 102 of FIGS. 1A-1B. As shown in the example of FIG. 2, computing device 200 includes one or more processors 202, memory 204, one or more storage devices 206, one or more input devices 208, one or more output devices 210, network interface 212, front-facing camera 214, and one or more flashbulbs 216. One or more processors 202 are, in some examples, configured to implement functionality and/or process instructions for execution within computing device 200. For example, processors 202 may process instructions stored in memory 204 and/or instructions stored on storage devices 206. Such instructions may include components of operating system 228, anti-spoofing module 220, facial recognition eligibility module 222, glint detection module 224, intensity module 226, frequency module 227, and one or more applications 230. Computing device 200 may also include one or more additional components not shown in FIG. 2, such as a power supply (e.g., a battery), a global positioning system (GPS) receiver, and a radio frequency identification (RFID) reader, among others.

Memory 204, in one example, is configured to store information within computing device 200 during operation. Memory 204, in some examples, is described as a computer-readable storage medium or a computer-readable storage device. In some examples, memory 204 is a temporary memory, meaning that a primary purpose of memory 204 may not be long-term storage. Memory 204, in some examples, is described as a volatile memory, meaning that memory 204 does not maintain stored contents when memory 204 is not receiving power. Examples of volatile memories include random access memories (RAM), dynamic random access memories (DRAM), static random access memories (SRAM), and other forms of volatile memories known in the art. In some examples, memory 204 is used to store program instructions for execution by processors 202. Memory 204, in one example, is used by software (e.g., operating system 228) or applications (e.g., one or more applications 230) executing on computing device 200 to temporarily store information during program execution.

One or more storage devices 206, in some examples, also include one or more computer-readable storage media and/or computer-readable storage devices. In some examples, storage devices 206 may be configured to store greater amounts of information than memory 204. Storage devices 206 may further be configured for long-term storage of information. In some examples, storage devices 206 include non-volatile storage elements. Examples of such non-volatile storage elements include magnetic hard discs, optical discs, solid-state discs, floppy discs, flash memories, forms of electrically programmable memories (EPROM) or electrically erasable and programmable memories, and other forms of non-volatile memories known in the art.

As shown in FIG. 2, computing device 200 may also include one or more input devices 208. One or more of input devices 208 may be configured to receive input from a user through tactile, audio, video, or biometric channels. Examples of input devices 208 may include a keyboard, mouse, touchscreen, presence-sensitive display, microphone, one or more still and/or video cameras, fingerprint reader, retina scanner, or any other device capable of detecting an input from a user or other source, and relaying the input to computing device 200, or components thereof. Though shown separately in FIG. 2, one or both of front-facing camera 214 and flashbulbs 216 may, in some instances, be part of input devices 208.

Output devices 210 of computing device 200, in some examples, may be configured to provide output to a user through visual, auditory, or tactile channels. Output devices 210 may include a video graphics adapter card, a liquid crystal display (LCD) monitor, a light emitting diode (LED) monitor, a cathode ray tube (CRT) monitor, a sound card, a speaker, or any other device capable of generating output that may be intelligible to a user. Output devices 210 may also include a touchscreen, presence-sensitive display, or other input/output capable displays known in the art.

Computing device 200, in some examples, also includes network interface 212. Computing device 200, in one example, utilizes network interface 212 to communicate with external devices via one or more networks, such as one or more wireless networks. Network interface 212 may be a network interface card, such as an Ethernet card, an optical transceiver, a radio frequency transceiver, or any other type of device that can send and receive information. Other examples of such network interfaces may include Bluetooth®, 3G, 4G, and WiFi® radios in mobile computing devices as well as USB. In some examples, computing device 200 utilizes network interface 312 to wirelessly communicate with external devices over a network.

Operating system 228 may control one or more functionalities of computing device 200 and/or components thereof. For example, operating system 228 may interact with applications 230, and may facilitate one or more interactions between applications 230 and one or more of processors 202, memory 204, storage devices 206, input devices 208, and output devices 210. As shown in FIG. 2, operating system 228 may interact with or be otherwise coupled to applications 230 and anti-spoofing module 220 and components thereof. In some examples, one or more of anti-spoofing module 220, facial recognition eligibility module 222, glint detection module 224, intensity module 226, and frequency module 227 may be included in operating system 228. In these and other examples, one or more of anti-spoofing module 220, facial recognition eligibility module 222, glint detection module 224, intensity module 226, and frequency module 227 may be part of applications 230. In other examples, one or more of anti-spoofing module 220, facial recognition eligibility module 222, glint detection module 224, intensity module 226, and frequency module 227 may be implemented externally to computing device 200, such as at a network location. In some such instances, computing device 200 may use network interface 212 to access and implement functionalities provided by anti-spoofing module 220 and its components, through methods commonly known as "cloud computing."

Anti-spoofing module 220 may implement one or more of the techniques described in this disclosure. For example, anti-spoofing module 220 may analyze an authentication image captured by front-facing camera 214 for possible spoofing, and cause operating system 228 and/or one or more of applications 230 to either grant or deny a user's request to proceed with authentication based on the analysis. In various examples, anti-spoofing module 220 may utilize one or more of facial recognition eligibility module 222, glint detection module 224, intensity module 226, and frequency module 227 to analyze the authentication image.

After computing device 200 captures an authentication image (e.g., using front-facing camera 214), anti-spoofing module 220 may begin analyzing the authentication image by determining whether the authentication image includes a representation of a human face. For example, facial recognition eligibility module 222 may implement one or more of the facial recognition techniques discussed above to detect a representation of a human face in the captured image. In various other examples, anti-spoofing module 220 may itself determine whether a captured image includes a representation of a face, or one or more of glint detection module 224, intensity module 226, and frequency module 227 may be operable to determine whether a captured authentication image includes a representation of a face. By determining whether a captured authentication image includes a representation of a human face, anti-spoofing module 220 may eliminate those instances in which one or more of glint detection module 224, intensity module 226, and frequency module 227 unnecessarily assess images that are ineligible for facial recognition.

Anti-spoofing module 220 may then analyze the captured authentication image for qualities that are characteristic of spoofing. For example, glint detection module 224 may determine whether or not the authentication image includes a corneal glint. The presence of corneal glint in the authentication image may indicate that the authentication image is legitimate (e.g., that the subject of the authentication image is an actual human face). Conversely, the absence of corneal glint in the authentication image may indicate that the authentication is spoof-based (e.g., that the subject of the authentication is reproduced image of a human face). Glint detection module 224 may first identify one or both eyes (more specifically, one or both corneas) in the authentication image. Glint detection module 224 may then determine whether corneal glint exists in the eye(s). If glint detection module 224 determines that corneal glint is absent in the authentication image, glint detection module 224 may prevent one or more facial recognition programs running on computing device 200 from performing facial recognition analysis on the authentication image. In this manner, glint detection module 224 may implement techniques of this disclosure to prevent erroneous authentication caused by spoofing.

In some examples, a spoof-based authentication image may include some level of corneal glint. For example, an unauthorized user may attempt to spoof facial recognition programs by presenting a photograph of an authorized user. The photograph may itself include corneal glint, as the photograph may have been taken directly of the authorized user. In this scenario, the spoof-based authentication image may capture the corneal glint represented in the photograph. However, the corneal glint in the spoof-based authentication image may be diminished or otherwise different when compared to the expected corneal glint of a legitimate authentication image. In such situations, one or both of intensity module 226 and frequency module 227 may implement techniques of this disclosure to detect the spoofing attempt and prevent erroneous authentication.

In various implementations, intensity module 226 may measure the intensity of the corneal glint in the authentication image, and compare the measured intensity to a threshold intensity. The threshold intensity may correspond to the intensity of corneal glint in a known legitimate authentication image. If the measured intensity is less than the threshold intensity, intensity module 226 may prevent one or more facial recognition programs running on computing device 200 from performing facial recognition analysis on the authentication image.

Additionally, intensity module 226 may measure the intensity in a number of ways. In some examples, intensity module 226 may measure the intensity based on angular metrics, such as luminous intensity or radiant intensity. In other examples, intensity module 226 may measure the intensity based on areal metrics, such as irradiance, illuminance, and luminous emittance. In still other examples, intensity module 226 may measure the intensity based on a combination of angular and areal metrics, such as radiance or luminance. By measuring the intensity in two or more ways, intensity module 226 may derive a more robust measurement of the intensity before comparing the measured intensity with the threshold intensity.

In some implementations, frequency module 227 may supplement, support, or replace the functionalities performed out by intensity module 226. Frequency module 227 may be operable to measure one or more frequencies associated with the corneal glint. A frequency may manifest in the form of visible and/or invisible colors. In some examples, frequency module 227 may define an acceptable frequency range for corneal glint in a captured authentication image. The acceptable frequency range may be based on known frequencies of the respective light beams emitted by flashbulbs 216. For example, the frequency of the emitted light beam may be a median point of the acceptable frequency range. If the frequency of the corneal glint falls outside the acceptable frequency range (i.e., exceeds the upper bound or is below the lower bound of the range), frequency module 227 may prevent one or more facial recognition programs running on computing device 200 from performing facial recognition analysis on the authentication image.

Some implementations may be enhanced to improve robustness and accuracy. For example, frequency module 227 may cause flashbulbs of computing device 200 to emit two or more light beams of varying frequencies, and cause front-facing camera 214 to capture a separate authentication image associated with each light beam. In this example, the respective frequencies of the light beams may be available to frequency module 227. Based on the known frequencies, frequency module 227 may calculate a frequency coefficient that indicates a difference between the frequencies of the light beams. Frequency module 227 may then measure the reflected frequency of each corneal glint of the authentication images. Based on the reflected frequencies, frequency module 227 may calculate a "reflected frequency coefficient" that indicates the difference between the reflected frequencies. Frequency module 227 may then compare the frequency coefficient of the emitted light beams to the reflected frequency coefficient (e.g., by calculating a ratio). If the calculated ratio exceeds a preprogrammed threshold ratio, frequency module 227 may detect a spoofing attempt, and prevent one or more facial recognition programs running on computing device 200 from performing facial recognition analysis on the authentication image.

While optical properties such as color are described for purposes of example with respect to frequency of light, these optical properties may be discerned by other types of analysis on emitted and/or reflected light. For example, color may be discerned from an optical property known as wavelength. On this basis, a sub-spectrum of colors may be represented as a "wavelength range." Wavelength may be a mathematical inverse of frequency. More specifically, one may derive a wavelength from a known frequency value by dividing 1 by the frequency value. In this manner, a computing device may implement techniques of this disclosure in a variety of ways to discern qualities of corneal glint.

In some implementations, frequency module 227 may cause flashbulbs 216 to modulate the color of the emitted light beam(s). More specifically, frequency module 227 may cause flashbulbs 216 to vary the color of the emitted light beams. In turn, glint detection module 224 may compare the color of any detected corneal glint to the color of the corresponding light beam. Frequency module 227 may additionally cause flashbulbs 216 to emit a series of light beams, with varying colors in the series. Glint detection module 224 may then detect corneal glint corresponding each light beam of the series, and compare the color of each detected corneal glint with the corresponding light beam of the series. For example, glint detection module 224 may authenticate a user when the corneal glint is blue in response to an emitted blue light beam, red for an emitted red light beam, and so on. In this manner, computing device 200 and components thereof may implement techniques of this disclosure to more robustly and reliably detect possible spoofing attempts.

As shown in FIG. 2, anti-spoofing module 220 may also include angle module 232, head orientation module 234, landmark detection module 236, and frame rate module 238. In some implementations, one or more of angle module 232, head orientation module 234, landmark detection module 236, and frame rate module 238 may be included in a liveness detection module (not shown for purposes of clarity). In various such implementations, the liveness module may form a distinct portion of computing device 200, or may be included in any of anti-spoofing module 220, applications 230, and operating system 228.

Angle module 232 may be configured or otherwise operable to determine angles associated with facial images captured by computing device 200 and components thereof (e.g., front-facing camera 214). As described with respect to FIG. 1, computing device 200 may capture multiple facial images of a user who attempts to gain access to functionalities controlled by computing device 200 by facial recognition authentication. In some such implementations, angle module 232 may be functional to determine one or more angles displayed across different facial images of the captured multiple facial images, thereby detecting one or more liveness gestures displayed across the multiple facial images.

For instance, angle module 232 may determine Tait-Bryan angles, such as yaw and/or pitch, displayed by a second captured facial image relative to a first captured facial image. In instances where the second facial image displays a yaw angle relative to the first facial image, anti-spoofing module 220 may detect a liveness gesture indicated by shaking of the user's head. In various examples, angle module 232 (and/or other components of anti-spoofing module 220) may compare a detected angle with a threshold angle. In the example of a yaw angle caused by shaking of a user's head, angle module 232 may set a minimum threshold (e.g., 25 degrees) of yaw to constitute a valid liveness gesture. Similarly, angle module 232 may set thresholds for pitch angle caused by nodding of a user's head to indicate liveness.

As shown in FIG. 2, anti-spoofing module 220 may also include head orientation module 234. Head orientation module 234 may, in various implementations, be configured or otherwise operable to classify the orientation of a user's head in a particular facial image. In some examples, head orientation module 234 may use pose detection or pose determination techniques to determine the orientation of the user's head in a captured facial image. In various scenarios, head orientation module 234 may match detected poses to predetermined orientations such as frontal, mid-profile, and profile orientations, as described above.

Head orientation module 234 may identify a liveness gesture based on a difference in poses between a first captured facial image and a second captured facial image. In some examples, anti-spoofing module 220 may seek a nodding motion of the user's head to determine an indication of liveness. In the context of predetermined orientations, head poses during a nodding motion may conform to one or more of the frontal orientation described above, as well as upward-facing and downward-facing orientations. In some scenarios, anti-spoofing module 220 may determine liveness based on a sequence of gestures, such as an upward nod followed by a downward nod. In one such scenario, anti-spoofing module 220 may use a set of four captured facial images to determine whether the sequence of liveness gestures have been performed satisfactorily.

In turn, head orientation module 234 may match the head pose of each of the four captured facial images to a predetermined head orientation. In the example described above, head orientation module 234 may seek to match the head poses of the four facial images to frontal, upward-facing, frontal, and downward-facing orientations, respectively, such as by using classifiers and/or face detectors associated with each of the orientations on the captured facial images. For example, to estimate an angle of a face, head orientation module 234 can use a bank of face detectors, where each detector is sensitive to a particular range of head angles. If head orientation module 234 determines (e.g., using the face detectors) that the four facial images, in the order in which they were captured, conform to the predetermined head orientations listed above, head orientation module 234 may determine that the user has performed the liveness gesture series satisfactorily for anti-spoofing purposes. Conversely, if head orientation module 234 detects any instances of non-conformance across the four facial images, anti-spoofing module 220 may determine that a user is attempting to spoof the facial recognition programs running on computing device 200, or that the captured facial images provide an inconclusive indication of the requested liveness gesture series. Examples of factors contributing to non-conformance include an incorrect sequence of poses, one or more missing poses, one or more poses that do not match a corresponding predetermined head orientation, and others. In any instance of non-conformance, anti-spoofing module 220 may cause computing device 200 to deny authentication to a user who attempts to authenticate via facial recognition.

As shown in FIG. 2, anti-spoofing module 220 may include landmark detection module 236. Landmark detection module 236 may be configured to detect the presence and/or absence of facial landmarks (or combinations of facial landmarks) in facial images, in order to discern liveness gestures. For example, in the example of a head shaking motion, the eyes of the facial image may serve as indicative facial landmarks. For example, as a user performs a left full-turn, the left eye of the facial image may diminish in size, and eventually vanish from visibility. More specifically, the left eye may not be visible in a facial image that conforms to a right profile orientation (e.g., at the completion of the left full-turn).

In such an example, landmark detection module 236 may detect the presence of both the left eye and right eye in a first captured facial image (which may conform to the frontal orientation described above). In a subsequent (e.g., second, third, etc.) captured facial image, landmark detection module 236 may detect an absence of the left eye. Based on the transition from the first facial image to the subsequent facial image (namely, from the presence to the absence of the left eye) detected by landmark detection module 236, anti-spoofing module 220 may determine that the user has performed the liveness gesture satisfactorily for anti-spoofing purposes. Landmark detection module 236 may use a variety of facial landmarks in the detection of liveness gestures. Examples include a nose base (a point at the vertically bottom and horizontally middle portion of the nose) which may be visible in the frontal orientation, but not in mid-profile and profile orientations, an earlobe, which may be visible in different dimensions and levels of detail over the various orientations, and others. Another example may be a nose bridge (a point on the nose at a mid-point between the irises), which may be invisible (or absent) in a profile orientation, but visible in a frontal orientation.

As shown in FIG. 2, anti-spoofing module 220 may also include frame rate module 238. As discussed, computing device 200 may, in various examples, capture facial images as frames of a video stream (e.g., in implementations where front-facing camera 214 has video capture capabilities). For instance, anti-spoofing module 220 may continually monitor a video stream captured by front-facing camera 214 to detect a liveness gesture indicated by two or more frames of the video stream. In some such scenarios, a user may attempt to spoof the facial recognition programs running on computing device 200 by presenting two spoof-based images of an authorized user (e.g., in sufficiently different poses to indicate a liveness gesture) before front-facing camera 214.

To prevent spoofing as described in the above example, anti-spoofing module 220 may use frame rate module 238. More specifically, frame rate module 238 may be configured to monitor a frequency at which the video stream is captured. The frequency may be expressed in terms of a number of frames per unit time, such as frames per second. If frame rate module 238 determines that the frame rate of the captured video stream is sufficiently slow (e.g., below a threshold frequency) for a user to spoof the facial recognition programs, anti-spoofing module 220 may determine that the captured video stream is prone to spoofing, and deny the user authentication by facial recognition. In this manner, frame rate module 238 may prevent erroneous authentication by spoofing when computing device 200 uses a video stream to determine indications of liveness.

In some implementations, anti-spoofing module 220 may determine the legitimacy of a captured video stream using factors other than frame rate. In one such implementation, anti-spoofing module 220 may continually perform face detection on all frames of the captured video stream. If the face detection fails at any point during the captured video stream, anti-spoofing module 220 may determine that the captured video stream is susceptible to a spoofing attempt, as the user may not be before front-facing camera 214 at all times during the capture of the video stream. In another implementation, anti-spoofing module 220 may cause the facial recognition programs of computing device 200 to continually perform facial recognition on all frames of the captured video stream. In this instance, anti-spoofing module 220 may determine a spoofing attempt in instances where facial recognition fails at any point during the captured video stream. In this manner, techniques of this disclosure may provide robust mechanisms to avoid erroneous authentication by spoofing when using a video stream to detect gestures that indicate liveness.

As shown in FIG. 2, anti-spoofing module 220 may also include sub-image module 240. Sub-image module 240 may implement certain techniques described herein, such as extracting sub-images that represent facial landmarks. In some specific implementations, sub-image module 240 may function in combination with landmark detection module 236. In such implementations, landmark detection module 236 may supply or otherwise communicate particular facial landmarks to sub-image module 240. In response, sub-image module 240 may extract sub-images from each facial image of multiple captured images, such that the extracted sub-images include representations of the supplied facial landmarks. As discussed, sub-image module 240 may extract sub-images of varying sizes from the various captured facial images. In some instances, sub-image module 240 may adjust one or more of the extracted sub-images to obtain a standard normalized correlation of the sub-images.

As described with respect to FIG. 1, adjusting (or "normalizing") the sub-images may include rotating, scaling, or otherwise modifying one or more of the sub-images to remove any remaining artifacts that arose from causes other than facial or liveness gestures. Such artifacts may include, for example, excessive rotational difference, excessive scale differences, and motion blur. For example, if the relative rotation/scale of a pair of images exceeds a threshold, anti-spoofing module 220 may disregard that pair of images. Similarly, anti-spoofing module 220 can account for motion blur by disregarding (i.e., not testing for liveness) pairs of faces if the position/scale of the face changes significantly between adjacent frames. In some instances of motion blur, sub-image module 240 may normalize the sub-images to eliminate, or otherwise remove from consideration, differences arising from motion blur. Aspects of motion blur and issues caused by motion blur are described in U.S. patent application Ser. No. 13/524,745, "FACIAL IMAGE QUALITY ASSESSMENT" which is incorporated herein in its entirety. Similarly, in instances of image size discrepancy, anti-spoofing module 220 (and/or components thereof) may scale, resize, crop, or otherwise adjust the captured facial sub-images and/or extracted sub-images.

In examples where front-facing camera 214 or other image capture devices controlled by computing device 200 include video capture capabilities, facial recognition eligibility module 222 may determine whether the frames of the video stream include a representation of a human face. If a certain number of frames (varying depending on configurations and settings) do not include the representation of the human face, facial recognition eligibility module 222 may cause anti-spoofing module 220 to deny authentication to a user. Facial recognition eligibility module 222 may also implement face detection techniques in instances where computing device 200 obtains two or more still images (i.e., not from a video stream) for the purposes of detecting a facial gesture or liveness gesture.

In the implementation illustrated in FIG. 2, anti-spoofing module 220 includes facial recognition module 242. Facial recognition module 242 may be configured or otherwise operable to perform facial recognition techniques described above with respect to the facial recognition programs of computing device 102 of FIG. 1. In examples, facial recognition module 242 may be implemented independent of anti-spoofing module 220, such as by operating system 228 or as part of applications 230. Facial recognition module 242 may grant or deny matches to facial images received by computing device 200 (e.g., using front-facing camera 214) for facial recognition authentication purposes. In examples, facial recognition module 242 may compare a facial image to an enrollment image or other (e.g., mathematical) representation of an authorized user's face.

In various implementations, anti-spoofing module 220 may, as part of detecting a facial and/or liveness gesture, select multiple facial images from a larger superset of available facial images. In one illustrative example, front-facing camera 214 may capture three facial images for the purposes of detecting a facial gesture and/or liveness gesture. Of the three facial images, anti-spoofing module 220 may determine that the first image and second image display a facial and/or liveness gesture relative to one another. In this instance, anti-spoofing module 220 may disregard the third image, and based on the facial and/or liveness gesture displayed by the first image and second image, grant authentication to the user. In this manner, anti-spoofing module 220 may select the first image and second image based on the detected facial gesture as displayed by the first and second images relative to one another.

Figure 3:
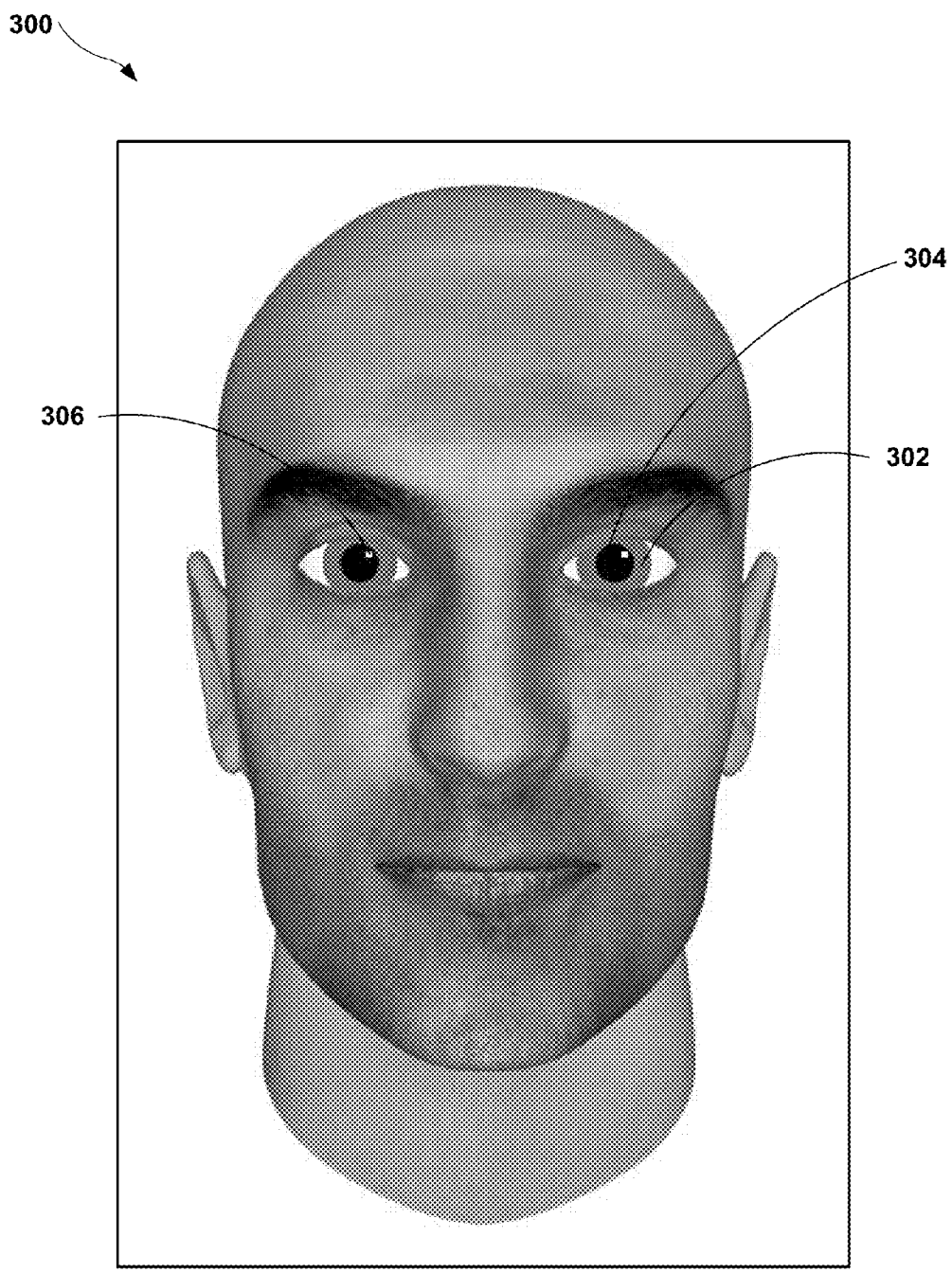
FIG. 3 is a conceptual diagram illustrating an example facial image that includes corneal glint identified by a computing device to detect possible spoofing in the facial image, in accordance with one or more aspects of this disclosure.

FIG. 3 is a conceptual diagram illustrating an example facial image that includes corneal glint identified by a computing device to detect possible spoofing in the facial image, in accordance with one or more aspects of this disclosure. Facial image 300 may be an example of an authentication image captured by a computing device such as computing devices 102 or 200, whether spoof-based or legitimate. A computing device may implement techniques of this disclosure to detect and analyze corneal glint 306, for determining whether facial image 300 is spoof-based or legitimate. For ease of illustration purposes only, FIG. 3 is discussed with respect to corneal glint 306 of a right eye of a subject of the facial image 300. In operation, a computing device in accordance with this disclosure may detect and analyze corneal glint 306, the corneal glint of the subject left eye, or both.

Similarly, FIG. 3 includes illustrations of certain facial elements, selected as non-limiting examples. More specifically, FIG. 3 illustrates iris 302 and pupil 304. As shown in FIG. 3, iris 302 and pupil 304 may provide a background against which light reflections, such as corneal glint 306 may be more clearly visible. In some examples, corneal glint 306 may include, be, or be part of a light reflection known as "catchlight" or "catch light." Catchlight may include a reflection of the surroundings of the cornea, particularly in situations where the surroundings are brightly lit. The nature of iris 302 and/or pupil 304 may reflect light and images placed in brightly lit environments, causing the phenomenon of catchlight.

As discussed, a computing device in accordance with this disclosure may detect a presence of corneal glint 306 in facial image 300 to determine whether facial image 300 is legitimate or spoof-based. In some examples, the computing device may determine that facial image 300 is legitimate based solely on the presence of corneal glint 306. In other examples, the computing device may analyze corneal glint 306, and use one or more analyzed qualities or characteristics of corneal glint 306 to determine whether facial image 300 is legitimate or spoof-based.

In some examples, the computing device may analyze two or more reflective intensities of corneal glint 306 to determine whether facial image 300 is legitimate or spoof-based. For example, the computing device may capture two different facial images. Each facial image may be associated with a light beam of varying intensity. For example, while capturing the first facial image, the computing device may emit a flash having high intensity. While capturing the second facial image, however, the computing device may emit a flash having low intensity.

Based on the known intensities, the computing device may calculate an intensity coefficient that indicates a difference between the intensities of the emitted flashes. The computing device may then measure the reflected intensity of corneal glint 306 in each facial image. Based on the reflected intensities, the computing device may calculate a "reflected intensity coefficient" that indicates the difference between the reflected intensities. The computing device may then compare the intensity coefficient of the emitted flashes to the reflected intensity coefficient (e.g., by calculating a ratio). If the calculated ratio exceeds or otherwise differs from a pre-programmed threshold ratio, the computing device may detect a spoofing attempt, and prevent one or more facial recognition programs running on the computing device from performing facial recognition analysis on the authentication image. In this example, the first facial image may serve as a "reference facial image" against which the computing device may compare the second facial image.

Figure 4:
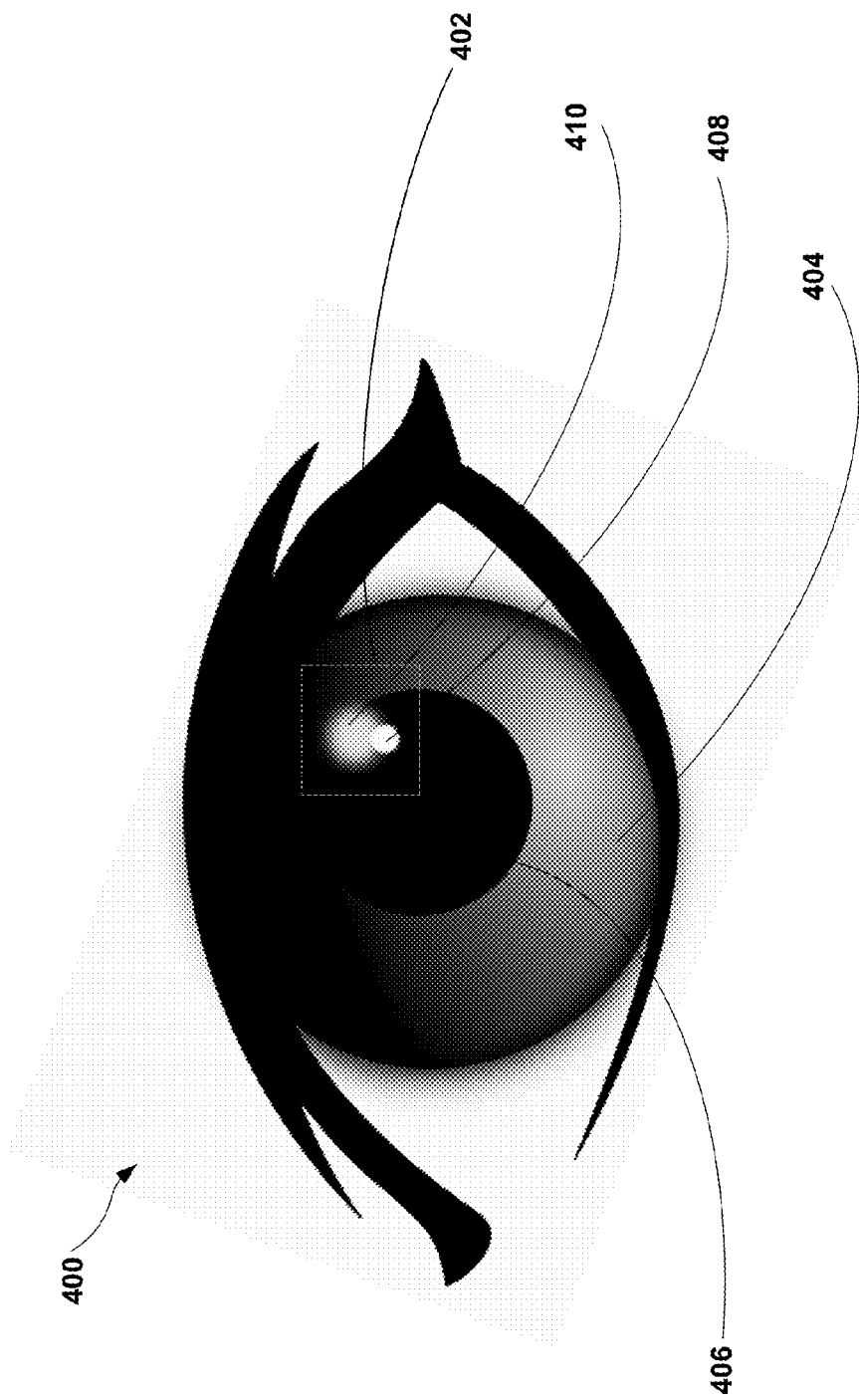
FIG. 4 is a conceptual diagram illustrating an example image of an eye that includes corneal glint identified by a computing device to detect possible spoofing in a facial image, in accordance with one or more aspects of this disclosure.

FIG. 4 is a conceptual diagram illustrating an example image of an eye that includes corneal glint identified by a computing device to detect possible spoofing in a facial image, in accordance with one or more aspects of this disclosure. FIG. 4 illustrates a close-up view of eye 400, which includes iris 404 and pupil 406. Portions of iris 404 and pupil 406 include corneal glint 402. As discussed, corneal glint 402 may be caused by natural and/or human-made light sources in the vicinity of eye 400, may be induced by an emission of a light beam, or any combination thereof.

In the example of FIG. 4, corneal glint 402 includes two portions, namely, a sharp lower portion 408 and a blurred upper portion 410. In some instances, blurred upper portion 410 may represent a common phenomenon known as a "specular highlight." Specular highlights may occur due to the curvature of eye 400, brightness of the light surrounding eye 400, proximity of eye 400 to a light source, and various other factors. In some examples, a computing device may implement techniques of this disclosure to identify a legitimate facial image based on the presence of a specular highlight. As discussed, a common reason for specular highlights is the curvature of eye 400, and thus, photographs used for spoofing may fail to generate a specular highlight. In this manner, techniques of this disclosure may utilize the phenomenon of specular highlights to detect suspected spoofing attempts.

In other examples, blurred upper portion 410 of corneal glint 402 may be a reflection caused by an object other than eye 400, such as a lens of eyeglasses. In some examples where a user wears eyeglasses, blurred upper portion 410 of corneal glint 402 may be separated from the sharper bottom portion of corneal glint 402. A computing device implementing techniques of this disclosure may recognize one or both portions of corneal glint 402 to identify a legitimate facial image. In this manner, techniques of this disclosure may allow authentication by an authorized user even in cases where the corneal glint is distorted by a user's need to wear eyeglasses.

Figure 5:
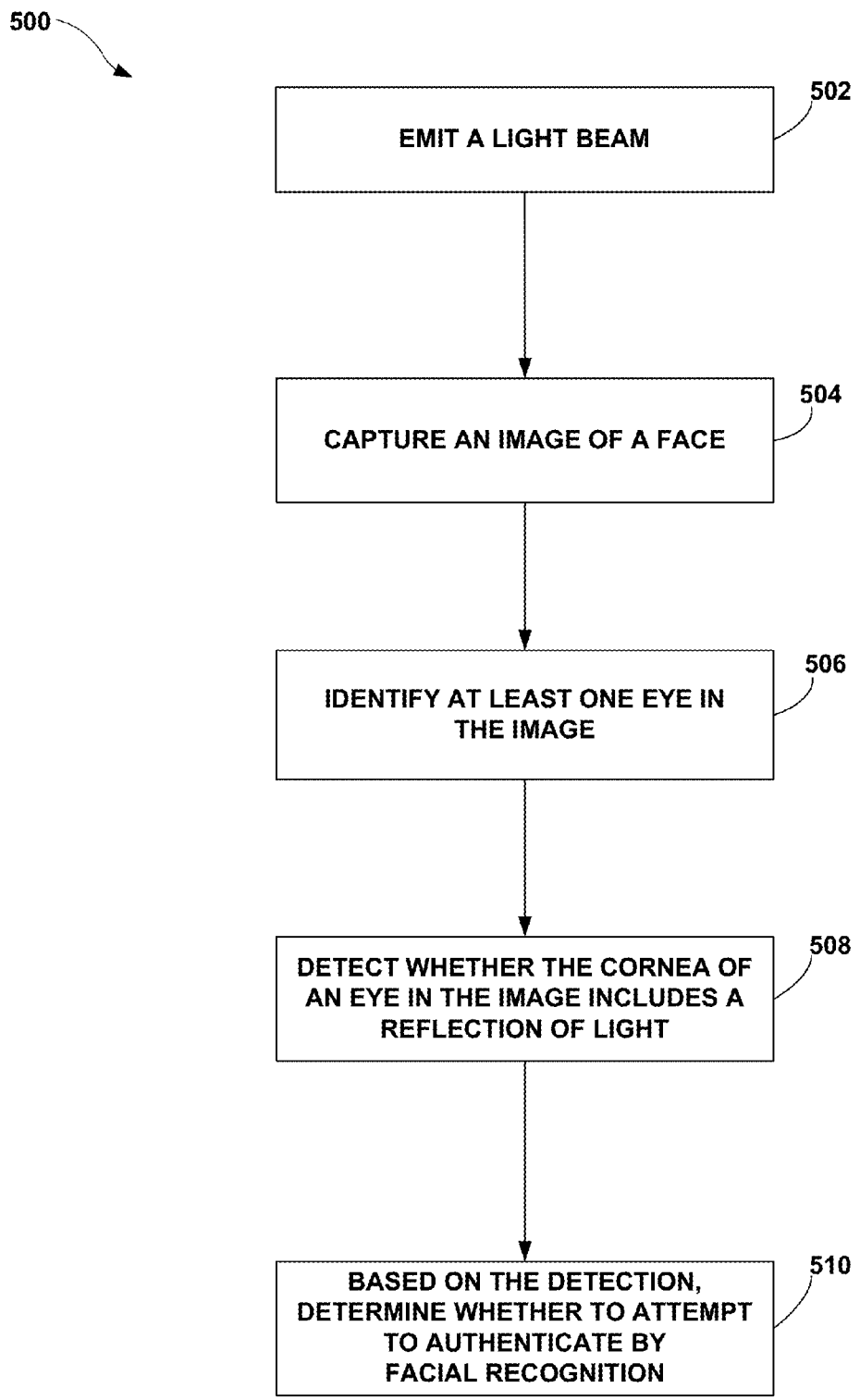
FIG. 5 is a flowchart illustrating an example process that may be performed by a computing device to detect possible spoofing in a captured facial image, in accordance with one or more aspects of this disclosure.

FIG. 5 is a flowchart illustrating an example process that may be performed by a computing device to detect possible spoofing in a captured facial image, in accordance with one or more aspects of this disclosure. Process 500 may begin when a computing device initiates an emission of a light beam (502). As discussed, in accordance with this disclosure, an example of a light beam may be a flash emitted by a flashbulb of, or coupled to, the computing device. The computing device captures an image of a face (504). The image may, in some instances, be an authentication image for purposes of authentication by facial recognition.

In the example of FIG. 5, the computing device identifies at least one eye in the captured facial image (506), and the computing device detects whether the cornea includes a reflection of light (508). More specifically, the cornea may form the front-facing, exposed portion of at least one eye identified in the captured facial image. Additionally, the reflection may be associated with the emitted light beam, and may include, be, or be part of a corneal glint.

Based on the success of the detection, the computing device determines whether to attempt to authenticate by facial recognition (510). More specifically, if the computing device does not detect the reflection of light, the computing device may not run one or more facial recognition programs on the captured facial image. Conversely, if the computing device successfully detects the reflection of light, the computing device may run one or more facial recognition programs on the captured facial image. Based on whether or not the facial recognition programs discern a match between the captured facial image and at least one stored enrollment image, the computing device may grant or deny authentication, respectively.

Figure 6:
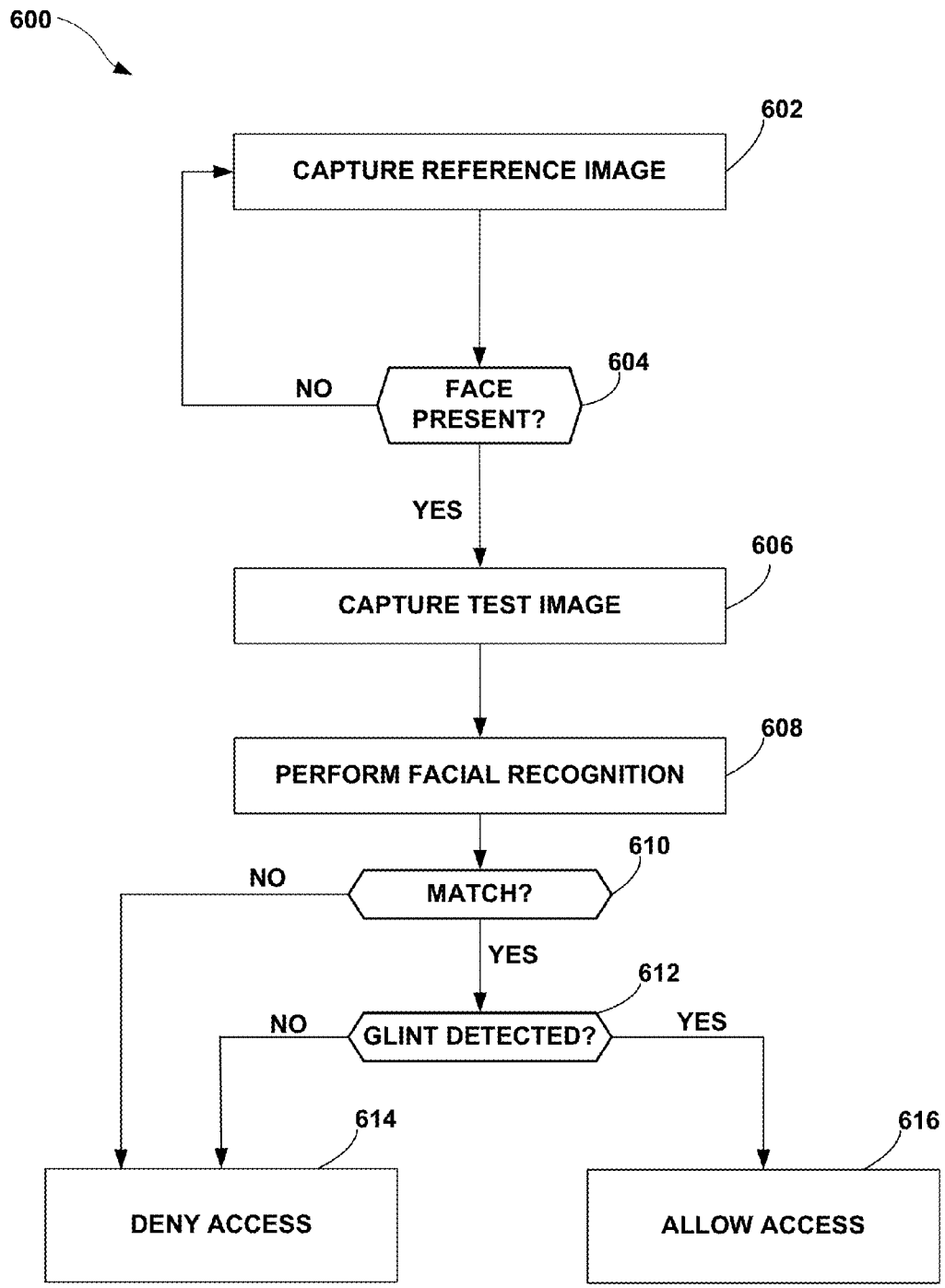
FIG. 6 is a flowchart illustrating an example process that may be performed by a computing device to detect possible spoofing in a captured facial image, in accordance with one or more aspects of this disclosure.

FIG. 6 is a flowchart illustrating an example process that may be performed by a computing device to detect possible spoofing in a captured facial image, in accordance with one or more aspects of this disclosure. Process 600 is only one example operation of a computing device in accordance with the present disclosure. In general, a computing device may implement process 600 to check for corneal glint, after one or more facial recognition programs assess an authentication image.

Process 602 may begin when the computing device captures a reference image (602). In some instances, the computing device may deactivate a light source, such as a flashbulb, a display-based light source, etc. before capturing the reference image. The computing device may then detect whether or not a representation of a human face is present in the reference image (604). If no face is present in the reference image, the computing device may capture the reference image again, either automatically, or by prompting a user to submit another reference image.

If the computing device successfully detects the face in the reference image, the computing device may capture a test image (606). At the time of capturing the test image, the computing device may activate one or more light sources, such as a flashbulb, a display-based light source, etc. The computing device may then perform facial recognition on the test image (608). More specifically, facial recognition programs running on the computing device may compare the test image to one or more enrollment images stored on the computing device. Based on the comparison, the computing device may determine whether or not grant the test image a match for facial recognition purposes (610). If the test image does not qualify for a facial recognition match, the computing device may deny access to one or more functionalities controlled by the computing device (614).

On the other hand, if the test image does qualify for a facial recognition match, the computing device may attempt to detect a corneal glint in the test image (612). The computing device may use either objective or subjective approaches to detecting the corneal glint. In an example objective approach, the computing device may analyze the test image alone. In an example subjective approach, the computing device may detect the corneal glint by comparing the test image to the reference image.

As discussed, the computing device may capture the reference image with light source(s) deactivated. However, the computing device may capture the test image while one or more light sources are activated. As a result, the computing device may induce corneal glint in the test image (if the test image is a legitimate facial image), but not in the reference image. If test image displays sufficient corneal glint when compared to the reference image, the computing device may detect corneal glint for purposes of step 612.

Based on the outcome of the corneal glint detection, the computing device may take various actions. If the computing device successfully detects the corneal glint, the computing device may allow access to functionalities controlled by the computing device based on facial recognition authentication (616). Based on the facial recognition match (610) and the corneal glint detection (616), the computing device may determine that the test image is a legitimate facial image, and not spoof-based. However, if the computing device fails to detect the corneal glint, the computing device may deny access by facial recognition authentication (614). Based on the failure to detect corneal glint, the computing device may determine that the test image is spoof-based, and thus prevent erroneous authentication by spoofing.

While the steps of process 600 are described in a particular order for purposes of example, a device may implement the steps in varying orders in accordance with one or more aspects of this disclosure. In some examples, the device may perform glint detection and facial recognition concurrently (or substantially concurrently). For example, the device may commence both glint detection and facial recognition at the same time, or commence one while the other is still in progress. In other examples, the device may perform glint detection before facial recognition, and vice-versa. In examples where the device performs glint detection after performing facial recognition, the device may deny authentication based on insufficient glint irrespective of the results of the facial recognition. In this manner, techniques of this disclosure may be implemented in various orders to achieve the anti-spoofing goals described herein.

While described largely with respect to unlocking a computing device for purposes of example, techniques of this disclosure may be implemented in various scenarios. In some instances, a computing device in accordance with this disclosure may control functionalities of another device, such as a door lock. In these examples, the facial recognition programs may cause the door lock to transition from locked to unlocked state, communicating the facial recognition match using a network interface or other communication channel. Such door locks may be used in various practical scenarios, such as to control access to safeboxes containing valuable data and documents, automobiles, or storage areas used for controlled substances, such as in a medical facility. In such examples, the computing device may implement techniques of this disclosure to detect spoofing attempts and prevent erroneous authentication by facial recognition in potentially sensitive situations.

Additionally, techniques of this disclosure may be applied in the form of blink detection. A device implementing the techniques may perform blink detection either in place of glint detection or as a supplement to glint detection. In one implementation, the device may emit a light beam in the form of a bright flash. The device may cause the flash to be sufficiently bright to cause a user to blink involuntarily. The device may detect the blink (one or both eyes closed either fully or partially) in at least one captured authentication image. In other implementations, the device may display a message instructing the user to blink within a particular time frame. In one such implementation, the device may capture multiple authentication images, and verify that the user blinked in an authentication image corresponding to the time when (s)he was instructed to blink. In another such implementation, the device may capture a single authentication image, and verify that the captured image includes an indication of a blink. When implemented in addition to glint detection techniques described herein, blink detection may add reliability and robustness. When implemented in a standalone fashion, blink detection may provide an alternate anti-spoofing measure by verifying that a captured image is that of a responsive user rather than a static picture or pre-recorded video of the user. In this manner, techniques of this disclosure may include the use of blink detection to perform and/or enhance anti-spoofing measures described herein.

Figure 7:
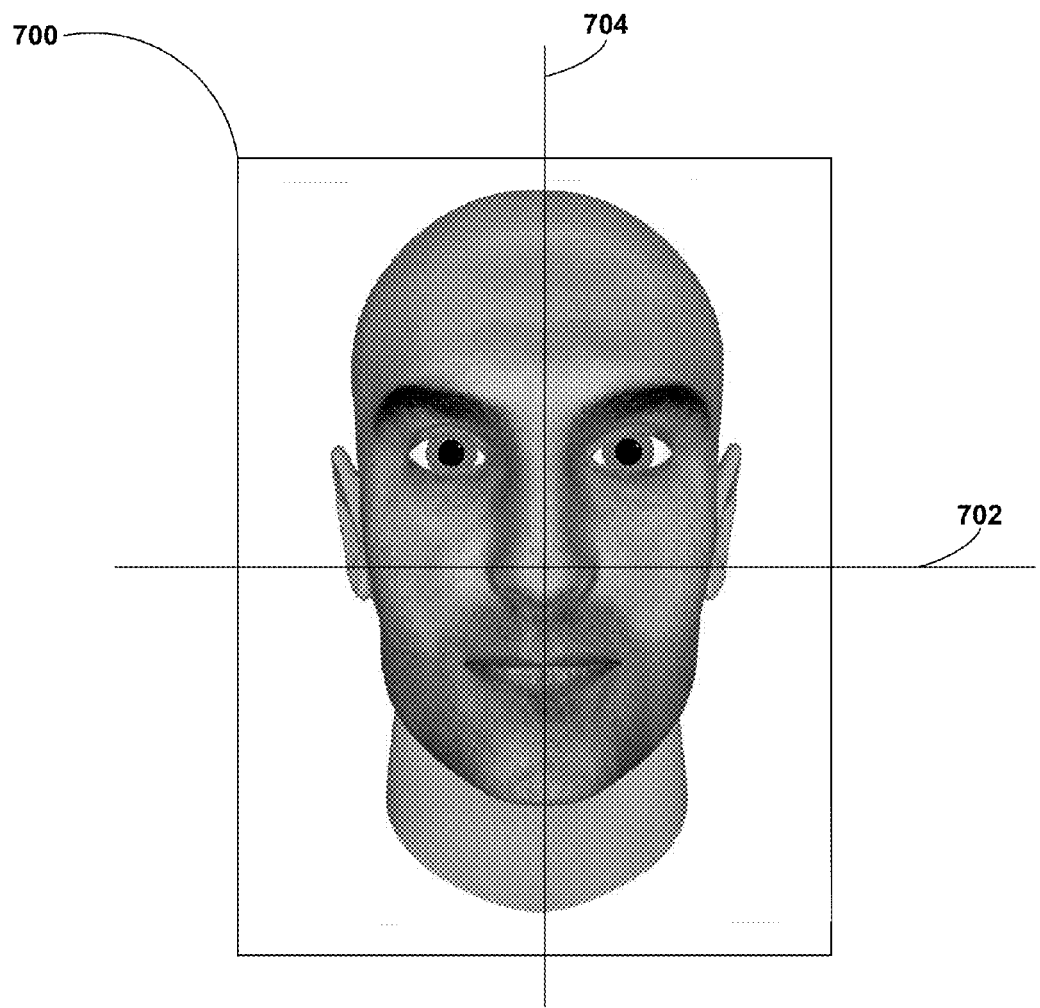
FIG. 7 is a facial image superimposed with a horizontal x-axis and a vertical y-axis, around which the facial image may display pitch and yaw, respectively.

FIG. 7 is a facial image 700 superimposed with a horizontal x-axis 702 and a vertical y-axis 704, around which facial image 700 may display pitch and yaw, respectively. As discussed, facial image 700 may display a yaw angle when rotated around y-axis 704. Alternatively, a facial image in which the user has turned to the left or right may display a yaw angle relative to facial image 700. Similarly, facial image 700 may display a pitch angle when rotated around x-axis 702, or a facial image in which the user faces upward or downward may display a pitch angle relative to facial image 700.

Figure 8C:
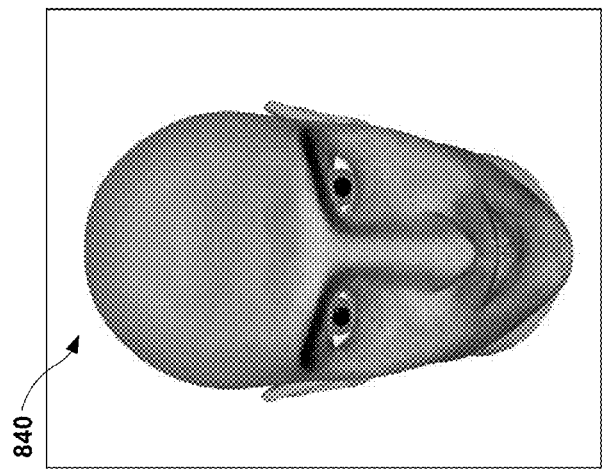
FIGS. 8A-8C are facial images that display pitch of varying magnitudes and directions.
Figure 8A:
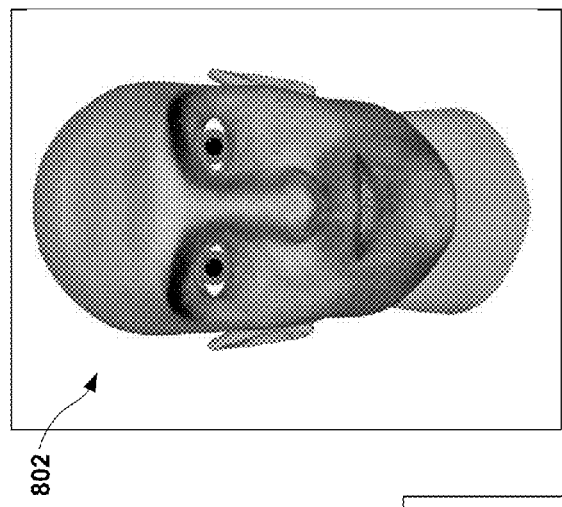
Figure 8B:
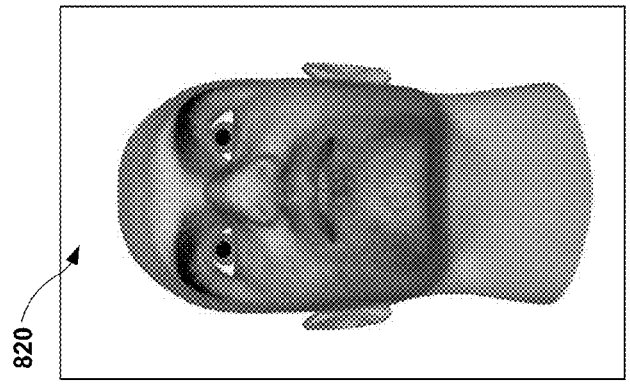

FIGS. 8A-8C are facial images that display pitch of varying magnitudes and directions. FIG. 8A illustrates front-facing facial image 802 with a pitch angle of zero (or close to zero) degrees. In the context of poses and head orientations described above, front-facing facial image 802 may conform to a frontal orientation. As shown in FIG. 8A, front-facing facial image 802 may represent a user's face while the user directly faces an image capture device.

FIG. 8B illustrates upward-facing facial image 820. Upward-facing facial image 820 may display a discernible level of pitch relative to front-facing facial image 802 illustrated in FIG. 8A. For example, under certain measurement techniques, upward-facing facial image 820 may display a pitch angle of between 35 degrees and 55 degrees relative to front-facing facial image 802 of FIG. 8A. In the context of poses and head orientations described above, upward-facing facial image 820 may conform to an upward-facing orientation.

FIG. 8C illustrates downward-facing facial image 840. Downward-facing facial image 840 may display a discernible level of pitch relative to front-facing facial image 802 of FIG. 8A as well as to upward-facing facial image 820 of FIG. 8B. For example, under certain measurement techniques, downward-facing facial image 840 may display a pitch angle of between 35 degrees and 55 degrees relative to front-facing facial image 802 of FIG. 8A. Under these and other measurement techniques, downward-facing facial image 840 may display a pitch angle of between 70 degrees and 110 degrees relative to upward-facing facial image 820 of FIG. 8B. In the context of poses and head orientations described above, downward-facing facial image 840 may conform to a downward-facing orientation.

Figure 9B:
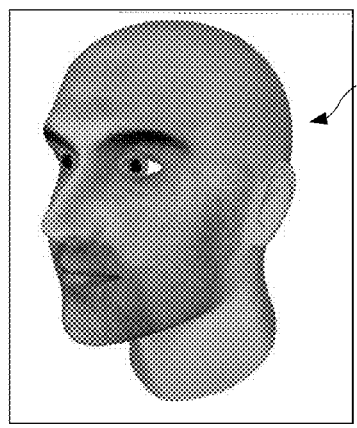
FIGS. 9A-9E are facial images that display yaw of varying magnitudes and directions.
Figure 9C:
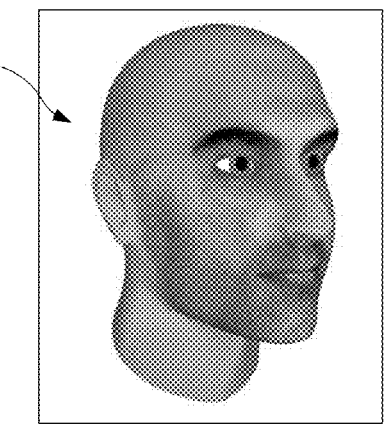
Figure 9A:
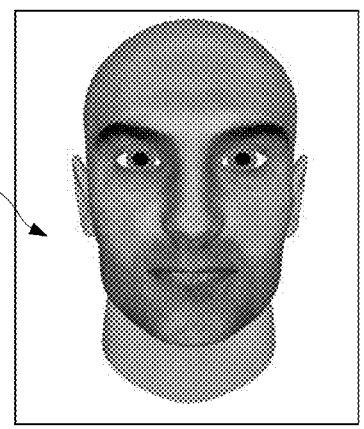

FIGS. 9A-9E are facial images that display yaw of varying magnitudes and directions. FIG. 9A illustrates front-facing facial image 910 with a yaw angle of zero (or close to zero) degrees. In the context of poses and head orientations described above, front-facing facial image 910 may conform to a frontal orientation. As shown in FIG. 9A, front-facing facial image 910 may represent a user's face while the user directly faces an image capture device.

FIG. 9B illustrates partially right-facing facial image 920. Partially right-facing facial image 920 may display a discernible level of yaw relative to front-facing facial image 910 illustrated in FIG. 9A. For example, under certain measurement techniques, partially right-facing facial image 920 may display a yaw angle of between 35 degrees and 55 degrees relative to front-facing facial image 910 of FIG. 9A. In the context of poses and head orientations described above, partially right-facing facial image 920 may conform to a mid-profile or partial-profile orientation.

FIG. 9C illustrates partially left-facing facial image 930. Partially left-facing facial image 930 may display a discernible level of yaw relative to front-facing facial image 910 illustrated in FIG. 9A. For example, under certain measurement techniques, partially left-facing facial image 920 may display a yaw angle of between 35 degrees and 55 degrees relative to front-facing facial image 910 of FIG. 9A. Additionally, under similar measurement techniques, partially left-facing facial image 930 may display a yaw angle of between 70 and 110 degrees relative to partially right-facing facial image 920 of FIG. 9B. In the context of poses and head orientations described above, partially left-facing facial image 930 may conform to a mid-profile or partial-profile orientation.

Figure 9D:
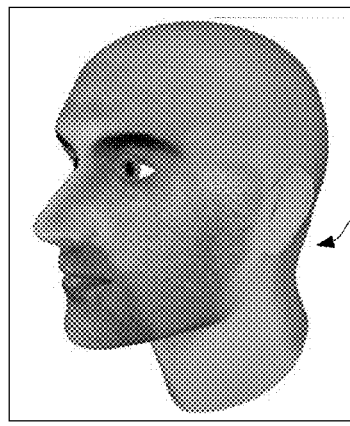

FIG. 9D illustrates right-facing facial image 940. Right-facing facial image 940 may display a discernible level of yaw relative to front-facing facial image 910 illustrated in FIG. 9A. For example, under certain measurement techniques, right-facing facial image 940 may display a yaw angle of between 80 degrees and 110 degrees relative to front-facing facial image 910 of FIG. 9A. Additionally, under similar measurement techniques, right-facing facial image 940 may display a yaw angle of between 35 degrees and 55 degrees relative to partially right-facing facial image 920 of FIG. 9B. In the context of poses and head orientations described above, right-facing facial image 940 may conform to a profile orientation.

Figure 9E:
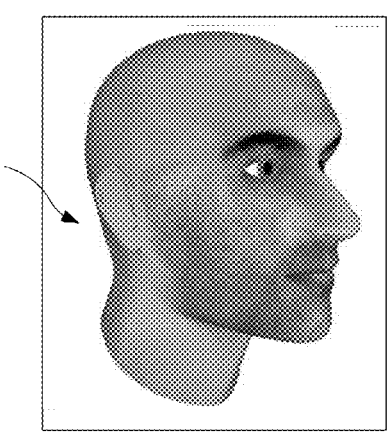

FIG. 9E illustrates left-facing facial image 950. Left-facing facial image 950 may display a discernible level of yaw relative to front-facing facial image 910 illustrated in FIG. 9A. For example, under certain measurement techniques, left-facing facial image 950 may display a yaw angle of between 80 degrees and 110 degrees relative to front-facing facial image 910 of FIG. 9A. Additionally, under similar measurement techniques, left-facing facial image 950 may display a yaw angle of between 35 degrees and 55 degrees relative to partially right-facing facial image 920 of FIG. 9B. Also, under similar measurement techniques, left-facing facial image 950 may display a yaw angle of between 160 degrees and 200 degrees relative to right-facing facial image 940 of FIG. 9D. In the context of poses and head orientations described above, left-facing facial image 950 may conform to a profile orientation.

Figure 10C:
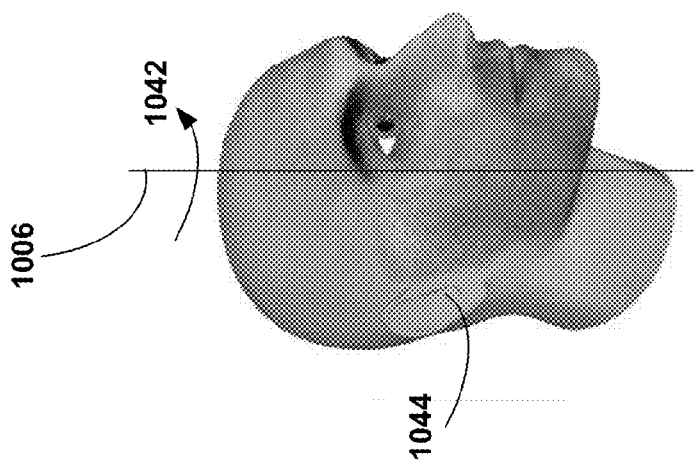
FIGS. 10A-10C are a series of facial images from which varying yaw magnitudes may be discerned using rotational angles and/or one or more facial landmarks, in accordance with one or more aspects of this disclosure.
Figure 10B:
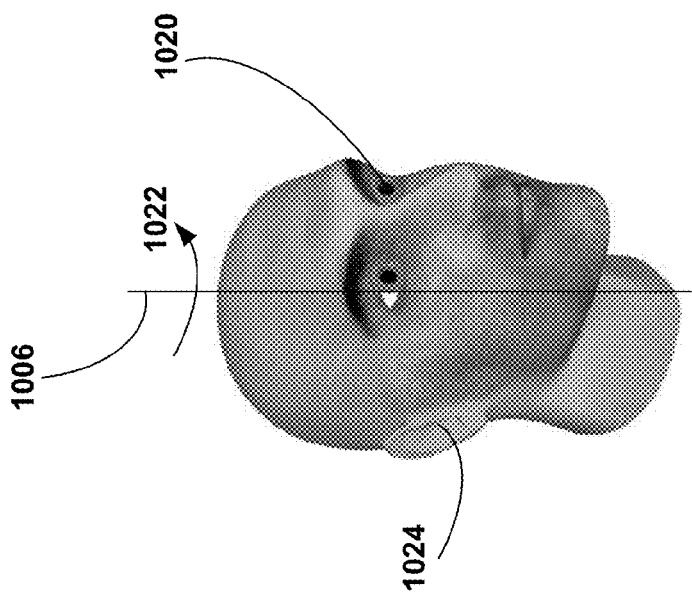
Figure 10A:
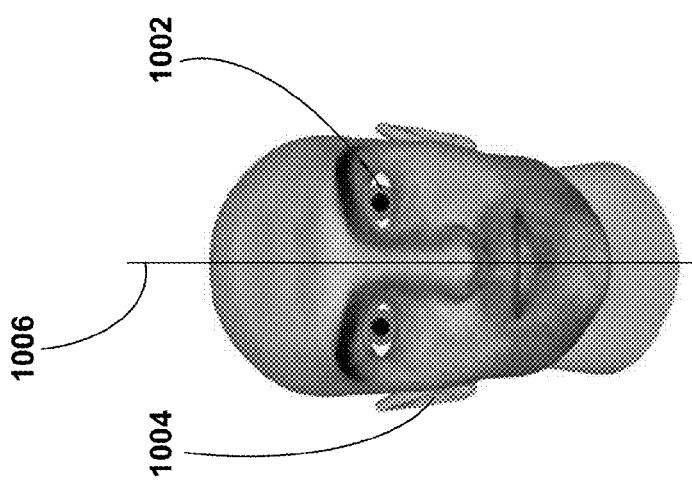

FIGS. 10A-10C are a series of facial images from which varying yaw magnitudes may be discerned using rotational angles and/or one or more facial landmarks, in accordance with one or more aspects of this disclosure. Each of FIGS. 10A-10C includes y-axis 1006, around which a yaw angle may be created and measured. FIG. 10A illustrates a front facing facial image (i.e., a facial image in a frontal orientation). Additionally, FIG. 10A includes facial landmarks including left eye 1002 and right earlobe 1004. As shown in FIG. 10A, left eye 1002 is visible in its substantial entirety in a facial image in frontal orientation. Conversely, only a portion of right earlobe 1004 is visible in a facial image in frontal orientation.

FIG. 10B illustrates a facial image in a mid-profile orientation, and more specifically, a partially left-facing facial image. Relative to the front-facing facial image of FIG. 10A, the partially left-facing facial image of FIG. 10B displays first yaw angle 1022 around y-axis 1006. Additionally, landmarks corresponding to those of FIG. 10A may be visible to different magnitudes in the partially left-facing facial image of FIG. 10B. For example, in contrast with the front-facing facial image of FIG. 10A, left eye 1020 is only partially visible in FIG. 10B. Conversely, right earlobe 1024 is visible in greater detail in the partially left-facing facial image of FIG. 10B as compared to the front-facing facial image of FIG. 10A.

FIG. 10C illustrates a facial image in a profile orientation, and more specifically, a left-facing facial image. Relative to the front-facing facial image of FIG. 10A and/or the partially left-facing facial image of FIG. 10B, the left-facing facial image of FIG. 10C displays second yaw angle 1024 around y-axis 1006. With respect to FIG. 10C, landmarks corresponding to those of FIGS. 10A-10B may be invisible, or visible to different magnitudes than in the facial images of FIGS. 10A-10B. For example, the left-facing facial image of 10C does not include a visible landmark corresponding to a user's left eye. This is in contrast to FIGS. 10A & 10B, which include a fully visible and a partially visible left eye landmark, respectively. Conversely, the left-facing facial image of FIG. 10C includes fully visible right earlobe 1044, in contrast to the partially visible right earlobes 1004 and 1024 of FIGS. 10A & 10B, respectively.

Figure 11:
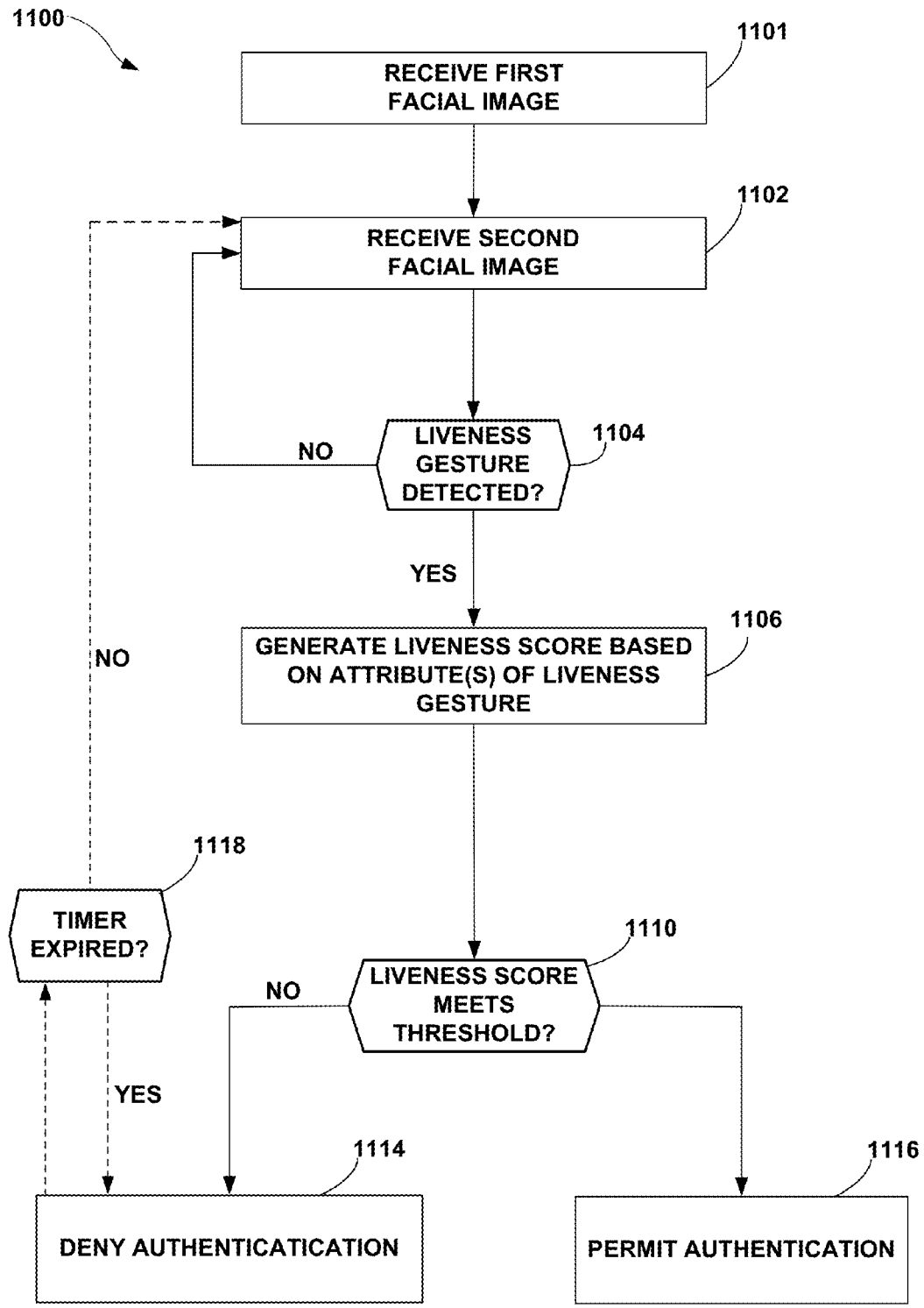
FIG. 11 is a flowchart illustrating an example process by which a computing device may perform one or more anti-spoofing techniques of this disclosure.

FIG. 11 illustrates an example process 1100 by which a computing device may perform one or more anti-spoofing techniques described herein. While process 1100 may be performed by a variety of computing devices in accordance with this disclosure, for purposes of clarity only, FIG. 11 will be described with respect to computing device 102 of FIGS. 1A-1B. Process 1100 may begin when computing device 102 receives a first facial image (step 1101). Additionally, computing device 102 may receive a second facial image, where the first and second facial images each include a representation of a user's face (step 1102). Computing device 102 may receive the facial images from an image capture device, such as a camera included in or otherwise coupled to computing device 102. In addition, at least one of the received facial images may have been granted a match by facial recognition programs controlled by computing device 102 (e.g., for authentication purposes).

Computing device 102 may attempt to detect a liveness gesture based on the received facial images (decision block 1104). If computing device 102 fails to detect a liveness gesture based on the received facial images, computing device 102 may once again receive a new instance of a second facial image for comparison the originally captured first facial image (i.e., return to step 1102). If, however, computing device 102 successfully detects a liveness gesture based on the received facial images, computing device may generate a liveness score based on one or more attributes of the detected liveness gesture (step 1106, described in further detail below). Computing device 102 may detect the liveness gesture based on certain comparisons of the first facial image and the second facial image. For example, computing device 102 may detect the liveness gesture based on one or both of a yaw angle and a pitch angle displayed by the second facial image relative to the first facial image. As discussed, the yaw angle may correspond to a transition around a vertical (y-) axis, and the pitch angle may correspond to a transition around a horizontal (x-) axis.

As described, if computing device 102 successfully detects a liveness gesture based on the received facial images, computing device may generate a liveness score based on one or more attributes of the detected liveness gesture (step 1106). For example, computing device 102 may generate the liveness score based on a yaw angle magnitude and/or a pitch angle magnitude. In examples, the liveness score may be directly proportional to the yaw angle magnitude and/or the pitch angle magnitude, i.e., a greater value of the yaw angle magnitude and/or the pitch angle magnitude may result in a greater value of the liveness score.

Computing device 102 may determine whether the value of generated liveness score to a threshold value (decision block 1110). The threshold value may indicate a minimum quality of the liveness gesture for anti-spoofing purposes. If the generated liveness score meets the threshold value, computing device 102 may permit authentication with respect to one or more functionalities controlled by computing device 102 (step 1116). On the other hand, if the liveness score does not meet the threshold value, computing device 102 may deny a user authentication with respect to the one or more functionalities (step 1114).

In several implementations, computing device 102 may execute a timer after initially denying authentication. While the timer is still running, computing device 102 may continue to monitor for another instance of a second facial image. More specifically, computing device 102 may check (e.g., periodically) whether the timer has expired (decision block 1118). If the timer has not expired, computing device 102 may receive another instance of the second facial image (i.e., return to step 1102).

Figure 12:
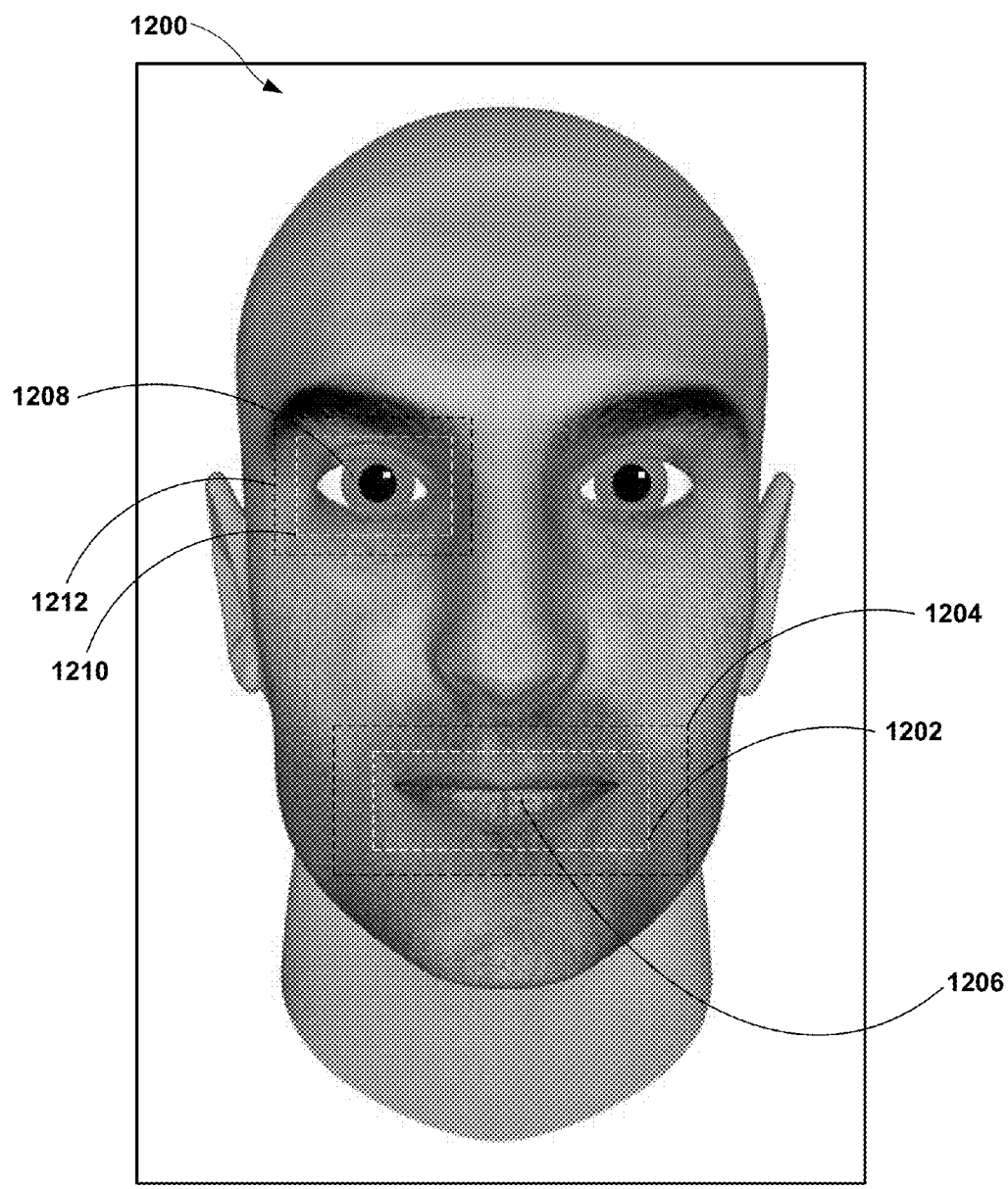
FIG. 12 is a facial image with example facial landmarks including a right eye and a mouth area as represented in extracted sub-images.

FIG. 12 is a facial image 1200 with example facial landmarks including right eye 1208 and mouth area 1206 as represented in extracted sub-images. More specifically, right eye 1208 is represented in first sub-image 1210 and second sub-image 1212. Similarly, mouth area 1206 is represented in third sub-image 1202 and fourth sub-image 1204. A computing device implementing the techniques herein may extract first sub-image 1210 and third sub-image 1202 from a common facial image (e.g., a "first image"). Similarly, the computing device may extract both second sub-image 1212 and fourth sub-image 1204 from a second image. Although first sub-image 1210 and second sub-image 1212 (similar to third sub-image 1202 and fourth sub-image 1204) may originate from different facial images, all four sub-images are described herein with respect to facial image 1200, for purposes of clarity and comparative discussion.

As discussed, a computing device may extract sub-images of a facial landmark from separate facial images, and compare the sub-images in any of a variety of ways, including computing a measured distance between the sub-images. For example, as part of detecting an ocular movement gesture, the computing device may compute a distance between first sub-image 1210 and second sub-image 1212. Similarly, as part of detecting a frown gesture, the computing device may measure the distance between third sub-image 1202 and fourth sub-image 1204. Additionally, as part of detecting a forehead wrinkle or a nose wrinkle, the computing device may measure the distance between sub-images representing a forehead region and a nose of facial image 1200 (not shown for purposes of clarity only). Additionally, second sub-image 1212 and fourth sub-image 1204 are larger than first sub-image 1210 and third sub-image 1202, as described with respect to FIG. 1.

In some examples, of facial image 1200, mouth area 1206 may serve as a "supplementary landmark" to right eye 1208. For example, the computing device may prompt a user to perform a sequence or series of facial gestures. The series may include facial gestures that are based on different landmarks, such as right eye 1208 and mouth area 1206. For example, the series may include an ocular movement and a frown gesture (the computing device may or may not specify a particular order in which to perform the gestures). In this example, right eye 1208 may form a primary landmark and mouth area 1206 may form a supplementary landmark, or vice versa. In some examples, a primary landmark may share common area with a supplementary landmark, such as right eye 1208 and a right eyebrow (not called out for purposes of clarity only). In other examples, such as right eye 1208 and mouth area 1206, the primary landmark and the supplementary landmark may share no common area.

Various implementations may call for any combination of facial gestures and liveness gestures described above. In various examples, the order of the gestures performed may or may not be relevant. As one example, a computing device implementing the techniques of this disclosure may permit authentication based on a combination of a blink and an upward nod, in any order. In another example, a computing device may implementing the techniques of this disclosure may permit authentication based on a sequence of a wink and a left half-turn, only in that particular order. In this manner, techniques of this disclosure may enable anti-spoofing measures based on various groups, sets, series and sequences of facial gestures and liveness gestures described herein.

Figure 13:
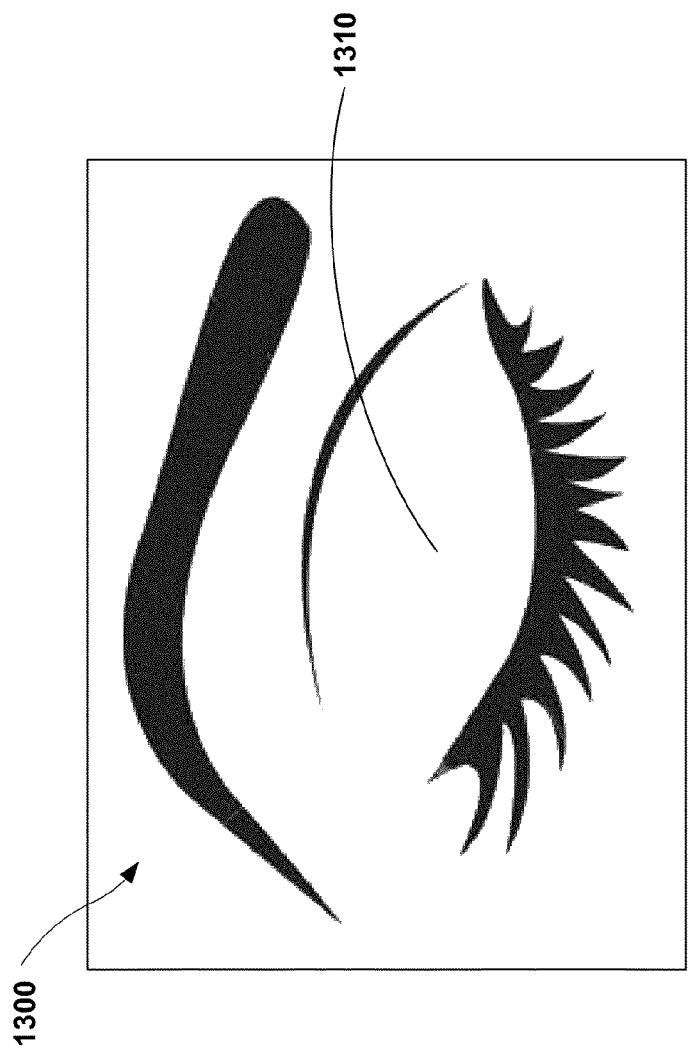
FIG. 13 is a conceptual diagram illustrating an example image of a closed eye.
Figure 14:
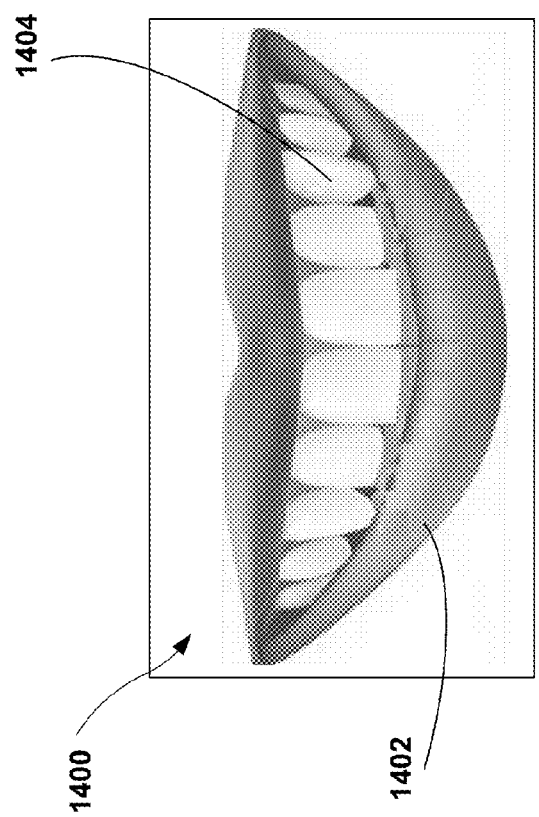
FIG. 14 is conceptual diagram illustrating an open-smiling mouth.

FIG. 13 is a conceptual diagram illustrating an example image of closed eye 1300. Closed eye 1300 may be a representation of eye 400 (of FIG. 4) in a closed state. Additionally, closed eye 1300 may indicate a portion of a wink or blink gesture (i.e., facial gestures that involve shutting of one eye or both eyes). As shown in FIG. 14, a substantial portion of closed eye 1300 is occupied by eyelid 1310. As discussed, the area covered by eyelid 1310 may display little to no pixel transitions, due to factors such as consistent skin color, etc. In comparison, eye 400 of FIG. 4 may display a greater number of pixel transitions, due to the visibility of features such as iris 404, pupil 406, glint 402, and others. A computing device implementing techniques of this disclosure may compare eye 400 to closed eye 1300 to obtain a measured distance based on the differences of these pixel transitions, as well as other factors. Based on the measured distance, the computing device may detect a facial gesture such as a wink or a blink.

FIG. 14 is conceptual diagram illustrating an open-smiling mouth 1400. Open-smiling mouth 1400 may include certain facial features such as lower lip 1402, teeth 1404, an upper lip (not called out for purposes of clarity only), and others. Open-smiling mouth 1400 may represent the state of mouth area 1206 (illustrated in FIG. 12) after a user performs an open-mouth smile gesture. In comparison to mouth area 1206 of FIG. 12 (which is in a closed state and in a non-expressive position), open-smiling mouth 1400 may include greater pixel transitions (e.g., between lower lip 1402 and teeth 1404) as well as a greater curvature (due to a concave-up nature of a smile). Based on comparing mouth area 1206 and open-mouth smile 1400, the computing device may measure a distance sufficient to indicate an open-mouth smile facial gesture.

Figure 15:
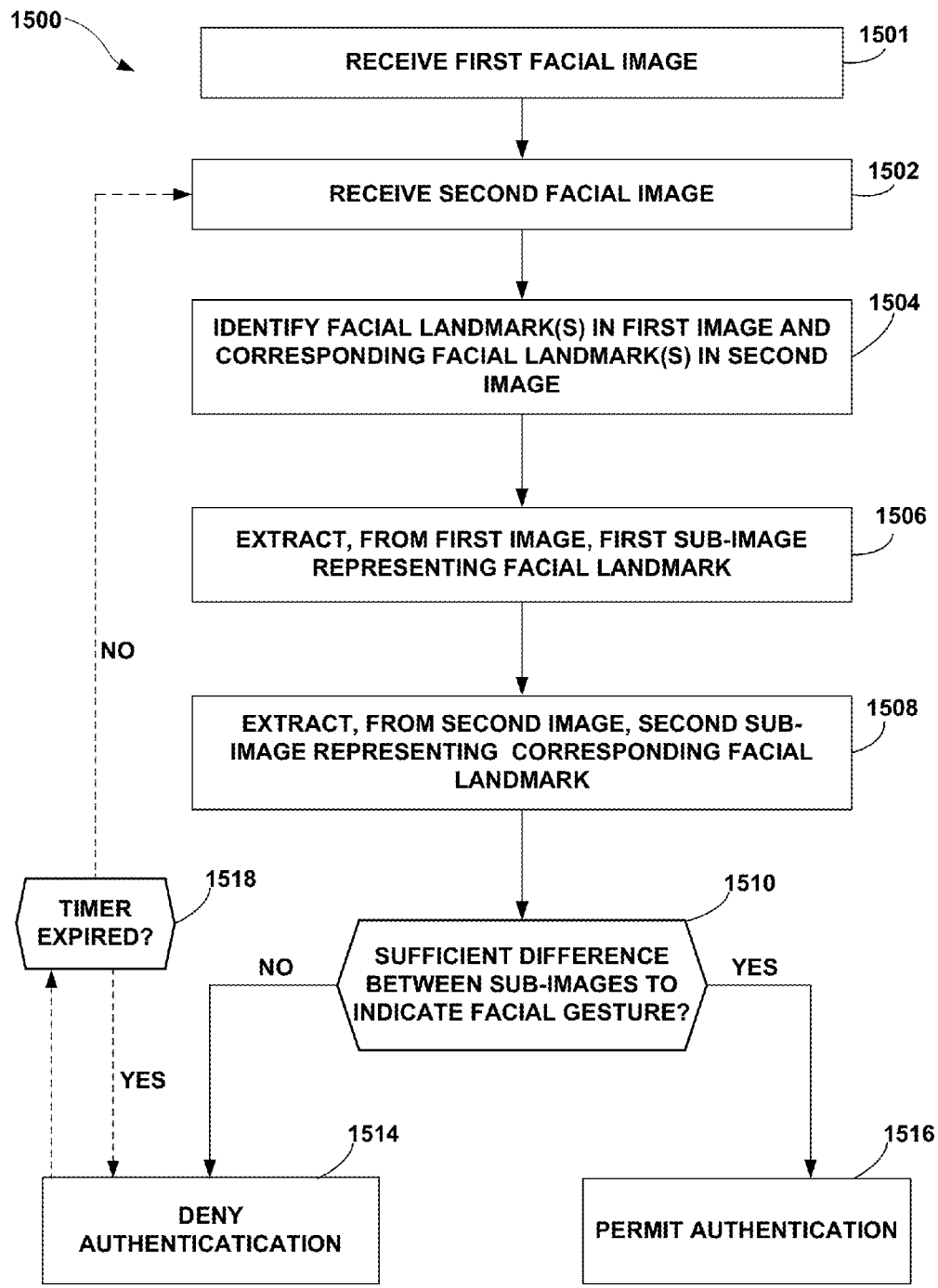
FIG. 15 is a flowchart illustrating an example process by which a computing device may perform various anti-spoofing techniques of this disclosure.

FIG. 15 is a flowchart illustrating an example process 1500 by which a computing device may perform various techniques of this disclosure. Although process 1500 may be performed by a variety of computing devices, process 1500 will be described herein with respect to computing device 102 of FIGS. 1A-1B, for purposes of clarity only. Process 1100 may begin when computing device 102 receives a first image of a user's face (step 1501). Additionally, computing device 102 may receive a second image of a user's face (step 1502). Computing device 102 may receive the first and second images as part of a larger of superset of images (e.g., a superset that also includes a third image of the user's face, etc.). In some examples, as discussed, the first and second images may form frames of a video stream captured by computing device, using a camera with video capture capabilities.

Computing device 102 may identify at least one facial landmark in the first image and at least one corresponding facial landmark in the second image (step 1504). As discussed, examples of such facial landmarks may include one or both eyes (e.g., an ocular strip), a mouth region, and others. Computing device 102 may extract a first sub-image from the first facial image, such that the first sub-image includes a representation of the identified facial landmark (step 1506). In instances of multiple facial landmarks, computing device 102 may extract a distinct sub-image for each landmark, combine landmarks into a single sub-image, etc. Additionally, computing device 102 may extract a second sub-image from the second facial image, such that the second sub-image includes a representation of a corresponding facial landmark (step 1508). In examples, the second sub-image may be larger than the first sub-image (e.g., by a factor of approximately 20% the size of the first sub-image).

Based on a comparison of the first sub-image to the second sub-image, computing device 102 may determine whether a sufficient difference exists to indicate a facial gesture (decision block 1510). As discussed, computing device may compare the sub-images by measuring a distance between the sub-images, thus expressing the difference. If computing device 102 detects the facial gesture based on the comparison, computing device 102 may permit authentication to a user, for anti-spoofing purposes (step 1516). In other words, if the facial recognition programs grant a match to one or both of the first and second facial images, computing device 102 may permit the user to access one or more functionalities controlled by computing device 102. If, however, computing device 102 does not detect the facial gesture based on the comparison, computing device 102 may deny authentication to the user (step 1514). In this event, computing device 102 may deny the authentication irrespective of the results of facial recognition analysis, if performed.

In several implementations, computing device 102 may execute a timer after initially denying authentication. While the timer is still running, computing device 102 may continue to monitor for another instance of a second facial image. More specifically, computing device 102 may check (e.g., periodically) whether the timer has expired (decision block 1518). If the timer has not expired, computing device 102 may receive another instance of the second facial image (i.e., return to step 1502).

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. Additional examples of computer readable medium include computer-readable storage devices, computer-readable memory, and tangible computer-readable medium. In some examples, an article of manufacture may comprise one or more computer-readable storage media.

In some examples, computer-readable storage media and/or computer-readable storage devices may comprise non-transitory media and/or non-transitory devices. The term "non-transitory" may indicate that the storage medium is tangible and is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
    receiving, from an image capture device coupled to a computing device, a first image of a face of a user, and a second image of the face of the user;
    identifying at least one facial landmark in the first image and at least one corresponding facial landmark in the second image;
    extracting, by the computing device, a first sub-image from the first image, wherein the first sub-image represents a portion of the first image, and wherein the first sub-image includes a representation of the at least one facial landmark;
    extracting, by the computing device, a second sub-image from the second image, wherein the second sub-image represents a portion of the second image, and wherein the second sub-image includes a representation of the at least one corresponding facial landmark;
    detecting a facial gesture by determining, by the computing device, whether a sufficient difference exists between the second sub-image and the first sub-image to indicate the facial gesture;
    determining, by the computing device, whether the first image of the face of the user and the second image of the face of the user are associated with a consistent user identity, based at least in part on determining whether a sufficient similarity exists between the first image of the face of the user and the second image of the face of the user; and
    determining, based at least in part on detecting the facial gesture and on determining whether the first image of the face of the user and the second image of the face of the user are associated with the consistent user identity, whether to deny authentication to the user with respect to accessing one or more functionalities controlled by the computing device.

2. The method of claim 1, further comprising:
    prompting the user to perform a predetermined facial gesture;
    determining whether the detected facial gesture matches the predetermined facial gesture;
    if the detected facial gesture does not match the predetermined facial gesture, denying authentication to the user with respect to accessing one or more functionalities controlled by the computing device; and
    if the detected facial gesture matches the predetermined facial gesture, granting authentication to the user with respect to accessing one or more functionalities controlled by the computing device.

3. The method of claim 1, wherein the at least one facial landmark comprises at least one of an eye, an eyebrow, a mouth area, a forehead area, and a nose, and wherein the indicated facial gesture includes at least one of a blink gesture, a wink gesture, an ocular movement, a smile gesture, a frown gesture, a tongue protrusion gesture, an open mouth gesture, an eyebrow movement, a forehead wrinkle gesture, and a nose wrinkle gesture.

4. The method of claim 1,
wherein the image capture device has video capture capabilities, and
wherein at least one of the first image and the second image form a portion of video data received from the image capture device.

5. The method of claim 1, further comprising:
performing facial recognition analysis on each of the first image and the second image;
if at least one of the first image and second image fail the facial recognition analysis, denying authentication to the user with respect to accessing one or more functionalities controlled by the computing device; and
if both of the first image and the second image pass the facial recognition analysis and the facial gesture is detected, granting authentication to the user with respect to accessing one or more functionalities controlled by the computing device.

6. The method of claim 1, further comprising:
adjusting one or both of the first sub-image and the second sub-image to obtain a standard normalized correlation of the first sub-image and the second sub-image.

7. The method of claim 6, wherein adjusting one or both of the first sub-image and the second sub-image comprises at least one of 1) rotating one or both of the first sub-image and the second sub-image, and 2) scaling one or both of the first sub-image and the second sub-image.

8. The method of claim 7, wherein scaling one or both of the first sub-image and the second sub-image is associated with correcting an image size discrepancy between the first sub-image and the second sub-image.

9. The method of claim 1, wherein receiving the first image and the second image further comprises selecting the first image and the second image from a plurality of images that includes at least the first image, the second image, and a third image.

10. The method of claim 9, wherein selecting the first image and the second image from the plurality of images comprises selecting based at least in part on the detected facial gesture.

11. The method of claim 1, further comprising:
receiving the first image and second image as frames of a video stream;
determining whether the video stream has a sufficiently high frame rate to indicate continuous frame capture;
determining whether each frame of the video stream includes a representation of a human face;
if at least one frame of the video stream does not include the representation of the human face, denying authentication to the user with respect to accessing one or more functionalities controlled by the computing device; and
if each of the first image and the second image includes the representation of the human face, granting authentication to the user with respect to accessing one or more functionalities controlled by the computing device.

12. The method of claim 1, wherein determining whether a sufficient similarity exists between the first image and the second image to indicate a consistent user identity further comprises at least one of: 1) performing facial recognition analysis on both of the first image and the second image, and 2) comparing one or more characteristics of the first image to one or more corresponding characteristics of the second image, and 3) determining a similarity score based on the comparison, wherein the sufficient similarity is determined to exist when the similarity score exceeds a similarity score threshold.

13. The method of claim 1, wherein the indicated facial gesture is a first facial gesture, the method further comprising:
receiving, from the image capture device, a third image of the face of the user, and a fourth image of the face of the user;
extracting a third sub-image from the third image and a fourth sub-image from the fourth image, wherein the third sub-image includes a representation of a supplementary facial landmark and the fourth sub-image includes a representation of a corresponding supplementary facial landmark; and
if the sufficient difference exists between the second sub-image and the first sub-image to indicate the first facial gesture:
detecting a second facial gesture based at least in part on determining whether a sufficient difference exists between the third sub-image and the fourth sub-image to indicate the second facial gesture,
wherein determining whether to deny authentication to the user comprises determining, based at least in part on the detected first facial gesture and the detected second facial gesture, whether to deny authentication to the user with respect to accessing one or more functionalities controlled by the computing device.

14. The method of claim 12, further comprising:
prompting the user to perform a series of facial gestures comprising the first facial gesture and the second facial gesture.

15. The method of claim 13, wherein the at least one landmark shares a common area with the supplementary facial landmark.

16. The method of claim 13, wherein the at least one landmark shares no common area with the supplementary facial landmark.

17. The method of claim 1, wherein the second sub-image is larger than the first sub-image extracted from the first image.

18. The method of claim 1, further comprising:
detecting a liveness gesture based on at least one of a yaw angle of the second image relative to the first image and a pitch angle of the second image relative to the first image, wherein the yaw angle corresponds to a transition centered around a vertical axis, and wherein the pitch angle corresponds to a transition centered around a horizontal axis;
generating a liveness score based on at least one of a yaw angle magnitude associated with the yaw angle and a pitch angle magnitude associated with the pitch angle; and
comparing the liveness score to a threshold value,
wherein determining whether to deny authentication to the user with respect to accessing one or more functionalities controlled by the computing device is further based on the comparison.

19. The method of claim 1, further comprising:
receiving, from the image capture device, a third image of the face of the user and a fourth image of the face of the user;
detecting a liveness gesture based on at least one of a yaw angle of the fourth image relative to the third image and a pitch angle of the fourth image relative to the third image, wherein the yaw angle corresponds to a transition centered around a vertical axis, and wherein the pitch angle corresponds to a transition centered around a horizontal axis;

generating a liveness score based on at least one of a yaw angle magnitude associated with the yaw angle and a pitch angle magnitude associated with the pitch angle; and comparing the liveness score to a threshold value, wherein determining whether to deny authentication to the user with respect to accessing one or more functionalities controlled by the computing device is further based on the comparison.

20. The method of claim 18, wherein determining whether to deny authentication to the user with respect to accessing one or more functionalities controlled by the computing device is further based on an order associated with the liveness gesture and the facial gesture.

21. The method of claim 1, further comprising:

determining whether motion blur exists in either the first image of the face of the user or the second image of the face of the user;

and if the motion blur exists in either the first image of the face of the user or the second image of the face of the user, disregarding both of the first image of the face of the user or the second image of the face of the user for purposes of detecting the facial gesture.

22. A computing device comprising:

a memory, at least one processor;

at least one image capture device operable by the at least one processor to capture a first image of a face of a user, and a second image of the face of the user;

a facial recognition module operable by the at least one processor to grant a match, by facial recognition, to at least one of the first image and the second image;

a landmark detection module operable by the at least one processor to identify at least one facial landmark in the first image and at least one corresponding facial landmark in the second image;

a sub-image extraction module operable by the at least one processor to:

extract a first sub-image from the first image, wherein the first sub-image represents a portion of the first image, and wherein the first sub-image includes a representation of the at least one facial landmark, and extract a second sub-image from the second image, wherein the second sub-image represents a portion of the second image, and wherein the second sub-image includes a representation of the at least one corresponding facial landmark; and an anti-spoofing module operable by the at least one processor to:

detect a facial gesture by determining whether a sufficient difference exists between the second sub-image and the first sub-image to indicate the facial gesture, determine whether the first image of the face and the second image of the face are associated with a consistent user identity, based at least in part on determining whether a sufficient similarity exists between the first image of the face of the user and the second image of the face of the user, and determine, based at least in part on detecting the facial gesture and on determining whether the first image of the face and the second image of the face are associated with the consistent user identity, whether to deny authentication to the user with respect to accessing one or more functionalities controlled by the computing device.

23. A computer-readable storage device encoded with instructions that, when executed, cause one or more processors of a computing device to perform operations comprising:

receiving, from an image capture device coupled to the computing device, a first image of a face of a user, and a second image of the face of the user;

identifying at least one facial landmark in the first image and at least one corresponding facial landmark in the second image;

extracting, by the computing device, a first sub-image from the first image, wherein the first sub-image represents a portion of the first image, and wherein the first sub-image includes a representation of the at least one facial landmark;

extracting, by the computing device, a second sub-image from the second image, wherein the second sub-image represents a portion of the second image, and wherein the second sub-image includes a representation of the at least one corresponding facial landmark;

detecting a facial gesture by determining, by the computing device, whether a sufficient difference exists between the second sub-image and the first sub-image to indicate the facial gesture;

determining whether the first image of the face and the second image of the face are associated with a consistent user identity, based at least in part on determining whether a sufficient similarity exists between the first image of the face of the user and the second image of the face of the user; and determining, based at least in part on detecting the facial gesture and on determining whether the first image of the face and the second image of the face are associated with the consistent user identity, whether to deny authentication to the user with respect to accessing one or more functionalities controlled by the computing device.

24. The method of claim 1, wherein determining whether the first image of the face and the second image of the face are each associated with a common user identity comprises determining based at least in part on comparing one or more characteristics of the first image to one or more corresponding characteristics of the second image.

25. The method of claim 24, wherein comparing one or more characteristics of the first image to one or more corresponding characteristics of the second image comprises comparing one or more of iris color, dimension of an eye, dimension of a nose, dimension of a mouth, hair color, and dimension of a head.

* * * * *